US010565258B2

(12) United States Patent
Brown et al.

(10) Patent No.: US 10,565,258 B2
(45) Date of Patent: Feb. 18, 2020

(54) SELECTING AND SHARING CONTENT

(71) Applicant: Comcast Cable Communications, LLC, Philadelphia, PA (US)

(72) Inventors: Sean Brown, Philadelphia, PA (US); Ali A. Khorram, Philadelphia, PA (US); Bradley Spenla, Philadelphia, PA (US); Dominque Izbicki, Philadelphia, PA (US); Lori Hylan-Cho, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 289 days.

(21) Appl. No.: 14/965,197

(22) Filed: Dec. 10, 2015

(65) Prior Publication Data
US 2017/0169039 A1 Jun. 15, 2017

(51) Int. Cl.
| | |
|---|---|
| *H04N 21/472* | (2011.01) |
| *G06F 16/78* | (2019.01) |
| *H04L 29/06* | (2006.01) |
| *H04N 21/475* | (2011.01) |

(52) U.S. Cl.
CPC .......... *G06F 16/7867* (2019.01); *H04L 65/60* (2013.01); *H04N 21/475* (2013.01); *H04N 21/47205* (2013.01)

(58) Field of Classification Search
CPC .................. H04N 21/47205; H04N 21/475
See application file for complete search history.

(56) References Cited

U.S. PATENT DOCUMENTS

| | | |
|---|---|---|
| 5,659,539 A | 8/1997 | Porter et al. |
| 5,983,275 A | 11/1999 | Ecclesine |
| 6,112,226 A | 8/2000 | Weaver et al. |

(Continued)

FOREIGN PATENT DOCUMENTS

| | | |
|---|---|---|
| EP | 2465262 A1 | 6/2012 |
| WO | 2011041088 A1 | 4/2011 |
| WO | 2014100338 A1 | 6/2014 |

OTHER PUBLICATIONS

U.S. Appl. No. 12/964,046, Data Segment Service, filed Dec. 9, 2010.

(Continued)

*Primary Examiner* — Robert J Hance
(74) *Attorney, Agent, or Firm* — Banner & Witcoff, Ltd.

(57) ABSTRACT

Systems and methods for selecting, editing, and sharing content are described. A user watching content on a display device may use a device, such as a mobile device, to select a portion of the content to share. An interface on the display device or the mobile device may be used to select the portion of the content to share, to edit the selected portion, and to comment on the selected portion, among other editing features. The mobile device may send information identifying the selected portion to a server, and the server may generate one or more playlists for the selected portion. The one or more playlists may be generated based on the information received from the mobile device and based on one or more playlists for the content provided by a network, such as a content delivery network. The one or more playlists may be sent to the device of another user and may be used to access the shared content portion.

20 Claims, 26 Drawing Sheets

(56) References Cited

U.S. PATENT DOCUMENTS

| | | | |
|---|---|---|---|
| 6,871,007 B1* | 3/2005 | Saeijs | G11B 20/12 386/241 |
| 7,886,327 B2 | 2/2011 | Stevens | |
| 8,761,392 B2 | 6/2014 | Chen et al. | |
| 2005/0210145 A1 | 9/2005 | Kim et al. | |
| 2008/0147608 A1 | 6/2008 | Sarukkai | |
| 2008/0285938 A1 | 11/2008 | Nakamura | |
| 2009/0022473 A1 | 1/2009 | Cope et al. | |
| 2009/0150947 A1* | 6/2009 | Soderstrom | G11B 27/034 725/93 |
| 2009/0172197 A1 | 7/2009 | Kalaboukis et al. | |
| 2009/0279852 A1 | 11/2009 | Morimoto et al. | |
| 2009/0281978 A1* | 11/2009 | Gordon | G06Q 10/10 706/52 |
| 2011/0231887 A1 | 9/2011 | West et al. | |
| 2011/0239253 A1* | 9/2011 | West | H04N 21/234363 725/46 |
| 2012/0017236 A1* | 1/2012 | Stafford | A63F 13/00 725/32 |
| 2012/0096357 A1 | 4/2012 | Folgner et al. | |
| 2012/0148215 A1 | 6/2012 | Kennedy | |
| 2012/0159182 A1* | 6/2012 | Rouse | G06F 21/10 713/189 |
| 2013/0013736 A1 | 1/2013 | Kennedy | |
| 2013/0014138 A1 | 1/2013 | Bhatia et al. | |
| 2013/0332834 A1 | 12/2013 | Li et al. | |
| 2014/0074855 A1* | 3/2014 | Zhao | G06F 16/94 707/746 |
| 2014/0089992 A1* | 3/2014 | Varoglu | H04N 21/4122 725/81 |
| 2014/0150044 A1* | 5/2014 | Takahashi | H04N 21/2225 725/116 |
| 2014/0313341 A1* | 10/2014 | Stribling | H04L 67/02 348/157 |
| 2014/0317707 A1* | 10/2014 | Kim | H04W 12/04 726/6 |
| 2015/0185965 A1* | 7/2015 | Belliveau | G11B 27/031 715/723 |
| 2016/0149956 A1* | 5/2016 | Birnbaum | H04L 63/101 726/1 |
| 2017/0134810 A1* | 5/2017 | Kashyap | H04N 21/4788 |
| 2017/0339463 A1* | 11/2017 | Pike | H04N 21/4725 |

OTHER PUBLICATIONS

U.S. Appl. No. 13/617,433, Data Segment Service, filed Sep. 14, 2012.
SnappyTV, "Our Company", 2 pages, http://snappytv.com/corp/company.html, retrieved Dec. 10, 2015.
Pantos, R. and W. May. "HTTP Live Streaming draft-pantos-http-live-streaming-14." Published by the Internet Engineering Task Force (IETF) dated Oct. 14, 2014, 94 pages.
IFRAME—Inline Frame, Web Design Group, retrieved May 15, 2015, 2 pages.
M3U, Wikipedia, http://en.wikipedia.org/wiki/M3U, retrieved Mar. 12, 2015, 6 pages.
Shazam, iTunes Store, http://itunes.apple.com/us/app/shazam/id28499359?mt=8, retrieved May 19, 2015, 3 pages.
HTTP Live Streaming Overview, Apple Inc., 39 pages, dated Feb. 11, 2014.
TV Moments Worth Sharing, MemeTV, https://memtv.com/, retrieved May 19, 2015, 7 pages.
Lunden, Ingrid. ConnecTV Acquires TweeTV to Add Real-Time Analytics to its Social TV Platform, http://techcrunch.com/2014*06/30/connectv-acquires-tweettv-to-add-real-time-analytics-to-its-social-tv-platform/, dated Jun. 30, 2014, 6 pages.
HTTP Live Streaming, Apple Developer, Apple Inc., retrieved Mar. 12, 2015, 2 pages.
Introduction, Apple Inc., https://developer.apple/library/ios/documentation/NetworkingInternet/Conceptual/StreamingMediaGuide/Introduction/Introduction.html, retrieved Dec. 10, 2015, 3 pages.
MPEG transport system, Wikipedia, Inc., http://en.wikipedia.org/wiki/MPEG_transport_stream, retrieved Mar. 12, 2015, 9 pages.
Revolutionize Your Content, SnappyTV, http://www/snappytv.com/corp/index.html, retrieved Dec. 10, 2015, 6 pages.
Experience TiVo BOLT, TiVO Discover, https://www.tivo.com/discover, retrieved Dec. 10, 2015, 5 pages.
Introducing Xbox SmartGlass, Microsoft, http://www.xbox.com/en-US/smartglass, retrieved Dec. 10, 2015, 4 pages.

* cited by examiner

SELECTING AND SHARING CONTENT

BACKGROUND

Users viewing content, such as television programs and movies, may desire to share or comment on the content using their mobile devices, but might not have the ability to easily do so. Some mobile devices use their microphones to identify content to comment on based on the audio detected by the microphone. However, these detection schemes might not be accurate if the detected audio cannot be identified or if the device is not close enough to the audio source.

SUMMARY

This summary is not intended to identify critical or essential features of the disclosures herein, but instead merely summarizes certain features and variations thereof. Other details and features will also be described in the sections that follow.

One method described herein may comprise a server receiving, for example, information identifying a clip of a video from a device, such as a user device. The video may comprise a plurality of segments, which may include frames and/or packets. The server may also receive a playlist for the video, such as from a content delivery network. For example, the server may receive the playlist for the video in response to it contacting the content delivery network. The playlist may comprise an index to each of the plurality of segments of the video. From the plurality of video segments of the video, a first set of segments corresponding to the clip of the video may be determined. A modified playlist for the video clip may be generated by removing, from the playlist for the video, indexes to a second set of segments from the plurality of segments that are outside a time range of the first set of segments. In some aspects, the modified playlist may be sent to a second device, and the modified playlist may be usable by the second device to access the video clip.

A method described herein may comprise a user device determining a video being displayed on a display device, which may be separate from the user device. The video may comprise a plurality of segments, which may include frames and/or packets. The method may comprise generating, for display on the user device, an interface for creating a clip of the video being displayed on the display device. The user device may receive, via the interface, a selection of a first set of segments from the plurality of segments, and the video clip may comprise the first set of segments. The user device may send, to a server for example, information comprising a start time of the clip, a duration or an end time of the clip, and a playlist for the video being displayed on the display device or an identifier for the playlist. The information may be usable by the server to create a playlist for the clip. In some aspects, the information may also comprise an identifier for a recipient of the playlist for the clip.

A method described herein may comprise receiving, from a first device, a selection that indicates a content item and a start time for a portion of the content item. Encryption information for the portion of the content item may also be determined. Based on one or more playlist for the content item, one or more modified playlist for the portion of the content item may be generated. In some aspects, the one or more modified playlist may comprise the encryption information. The one or more modified playlist may be sent to a second device, and the one or more modified playlist may be usable by the second device to access the portion of the content item.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
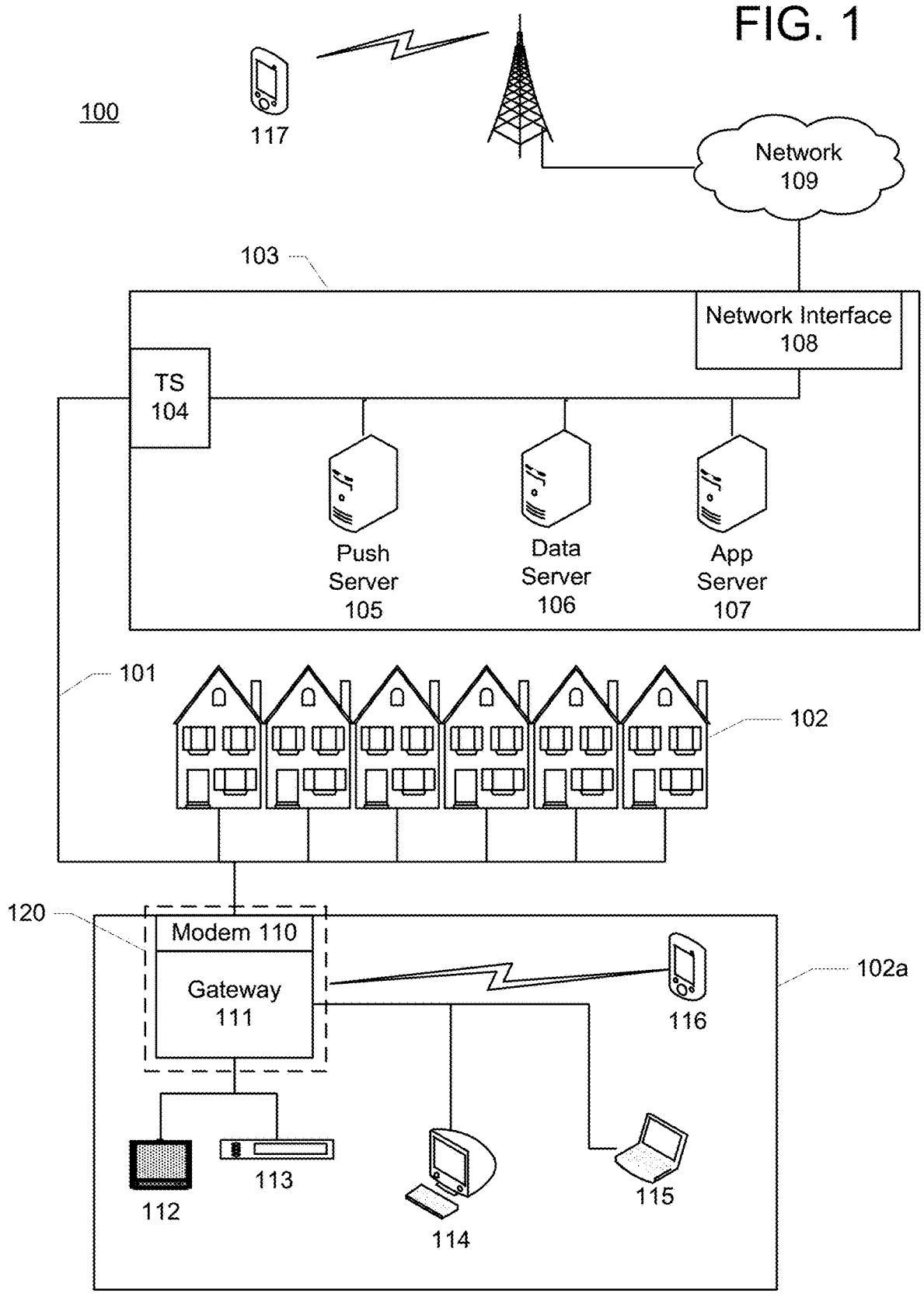
FIG. 1 illustrates an example information access and distribution network.

FIG. 1 illustrates an example information access and distribution network 100 on which many of the various features described herein may be implemented. The network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as locations 102 (e.g., homes, businesses, institutions, etc.), to a local office 103 (e.g., a central office or headend). The local office 103 may transmit downstream information signals onto the links 101, and each location 102 may have a receiver used to receive and process those signals.

There may be one link 101 originating from the local office 103, and it may be split a number of times to distribute the signal to various locations 102 in the vicinity (which may be many miles) of the local office 103. Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103 may include an interface 104, which may be a termination system (TS), such as a cable modem termination system (CMTS), which may be a computing device configured to manage communications between devices on the network of links 101 and backend devices such as servers 105-107 (to be discussed further below). The interface 104 may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream channels or frequencies to be received by devices, such as modems at the various locations 102, and to receive upstream communications from those modems on one or more upstream frequencies. The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones (e.g., cell phone 117).

As noted above, the local office 103 may include a variety of servers 105-107 that may be configured to perform various functions. For example, the local office 103 may include a push notification server 105. The push notification server 105 may generate push notifications to deliver data and/or commands to the various locations 102 in the network (or more specifically, to the devices in the locations 102 that are configured to detect such notifications). The local office 103 may also include a data server 106. The data server 106 may be one or more computing devices that are configured to provide data to users in the homes. This data may be, for example, video on demand movies, television programs, songs, text listings, etc. The data server 106 may include software to validate user identities and entitlements, locate and retrieve requested data, encrypt the data, and initiate delivery (e.g., streaming) of the data to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting data such as television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the locations 102.

An example location 102a may include an interface 120. The interface may comprise a device 110, such as a modem, which may include transmitters and receivers used to communicate on the links 101 and with the local office 103. The device 110 may be, for example, a coaxial cable modem (for coaxial cable links 101), a fiber interface node (for fiber optic links 101), or any other desired modem device. The device 110 may be connected to, or be a part of, a gateway 111 (e.g., a gateway interface device). The gateway 111 may be a computing device that communicates with the device 110 to allow one or more other devices in the home to communicate with the local office 103 and other devices beyond the local office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), tablets, smartwatches, etc.), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
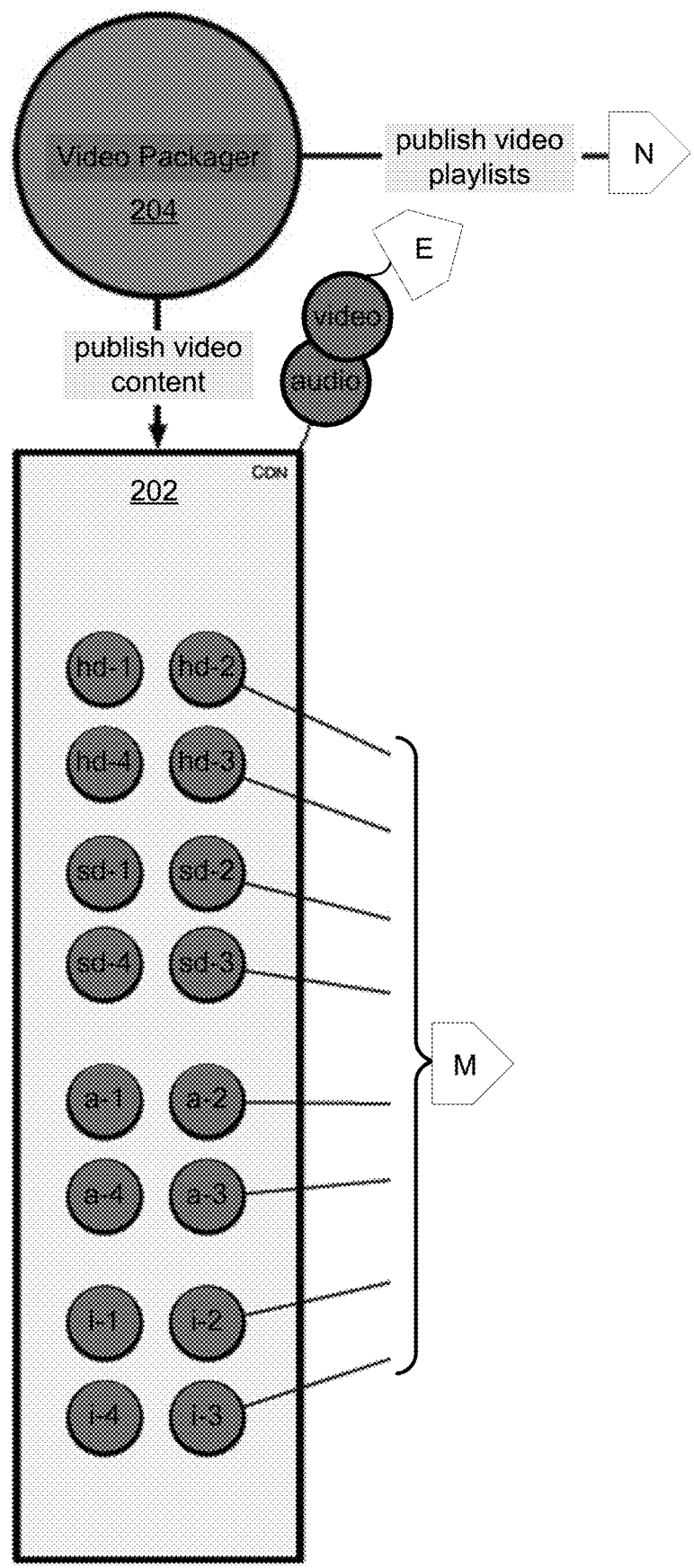
FIGS. 2-8 illustrate an example system for selecting and sharing content according to one or more illustrative aspects of the disclosure.
Figure 3:
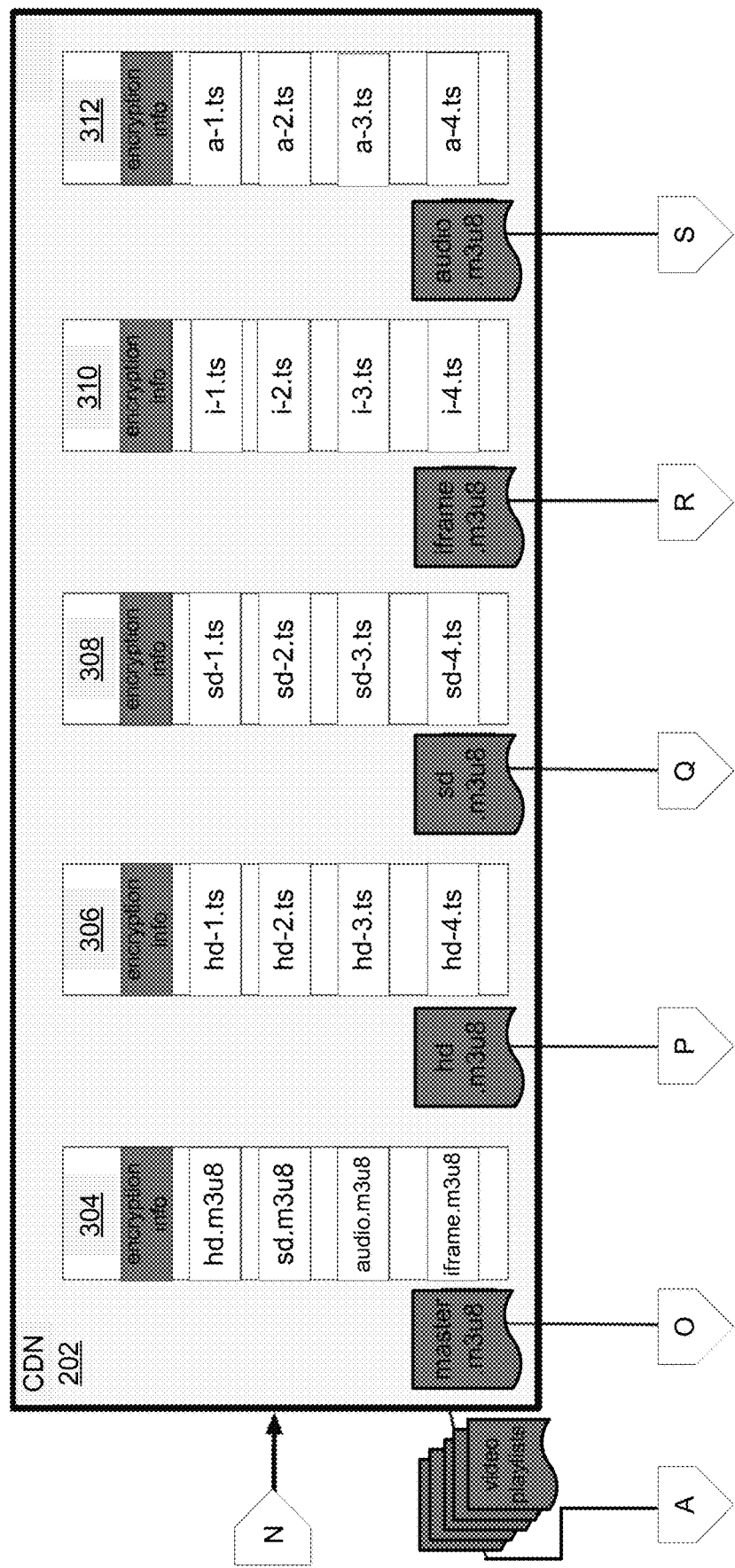

FIGS. 2-8 illustrate an example system for selecting and sharing content according to one or more illustrative aspects of the disclosure. A general overview of the system will now be provided, with a more detailed description to follow. With reference to FIG. 2 and FIG. 3, the system may comprise a content delivery network (CDN) 202. The CDN 202 may store and/or deliver content to user devices in various formats and segments. The CDN 202 may also store playlists for the content. The system may comprise a video packager 204 configured to publish content and/or playlists to the CDN 202.

Figure 4:
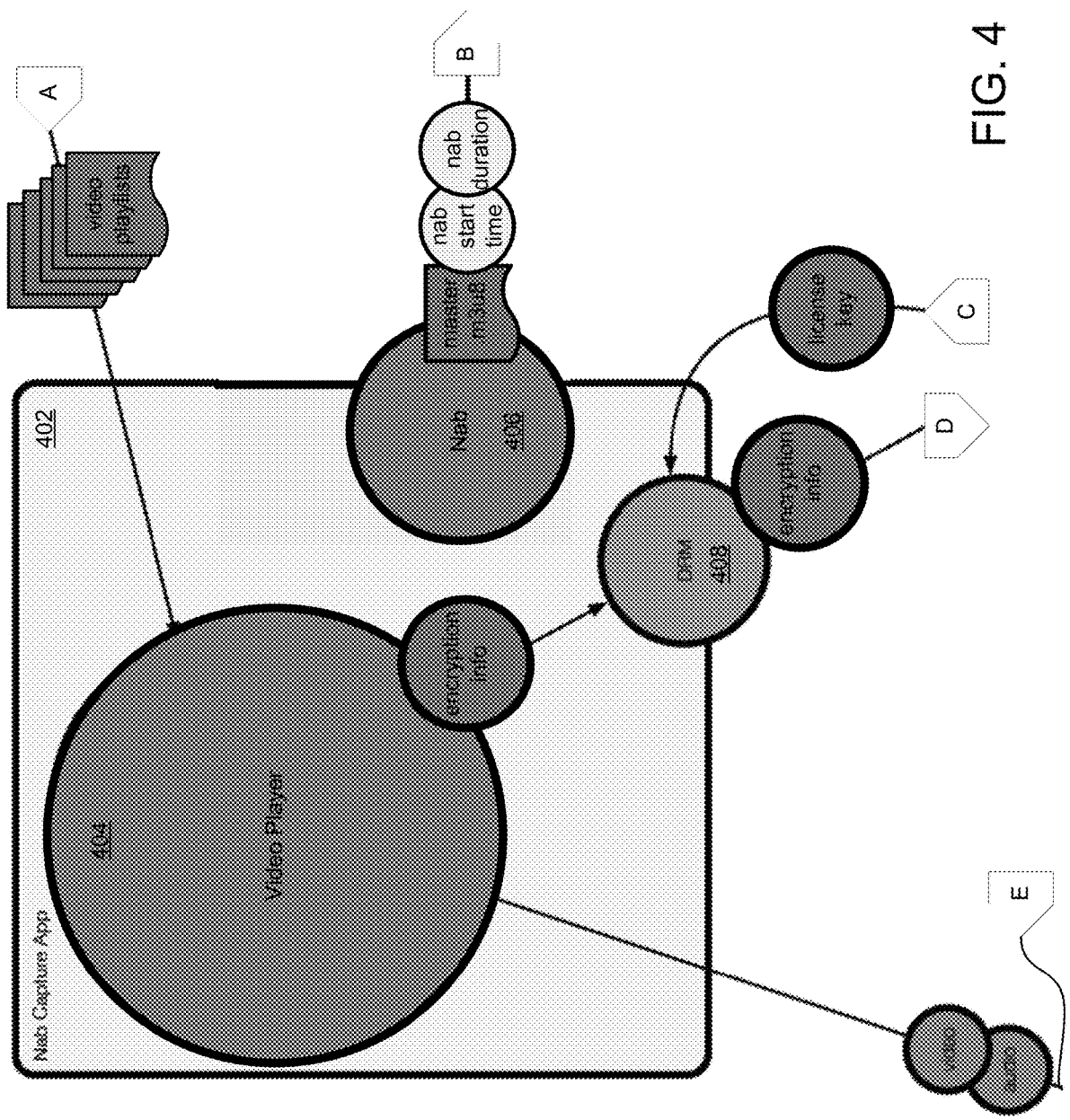

With reference to FIG. 4, the system may comprise a first device 402, which may comprise any of the user devices illustrated in FIG. 1, such as the personal computer 114, laptop computer 115, or wireless device 116. The first device 402 may run an application that is configured to select, share, and/or access content, such as a video clip. In some aspects, a user of the first device 402 may download the application and sign in to the application (or otherwise register with a content provider or service), such as a multichannel video program distributor. The system may also comprise a separate display device (not illustrated), such as the television 112, which may be used by the user to display content.

Figure 5:
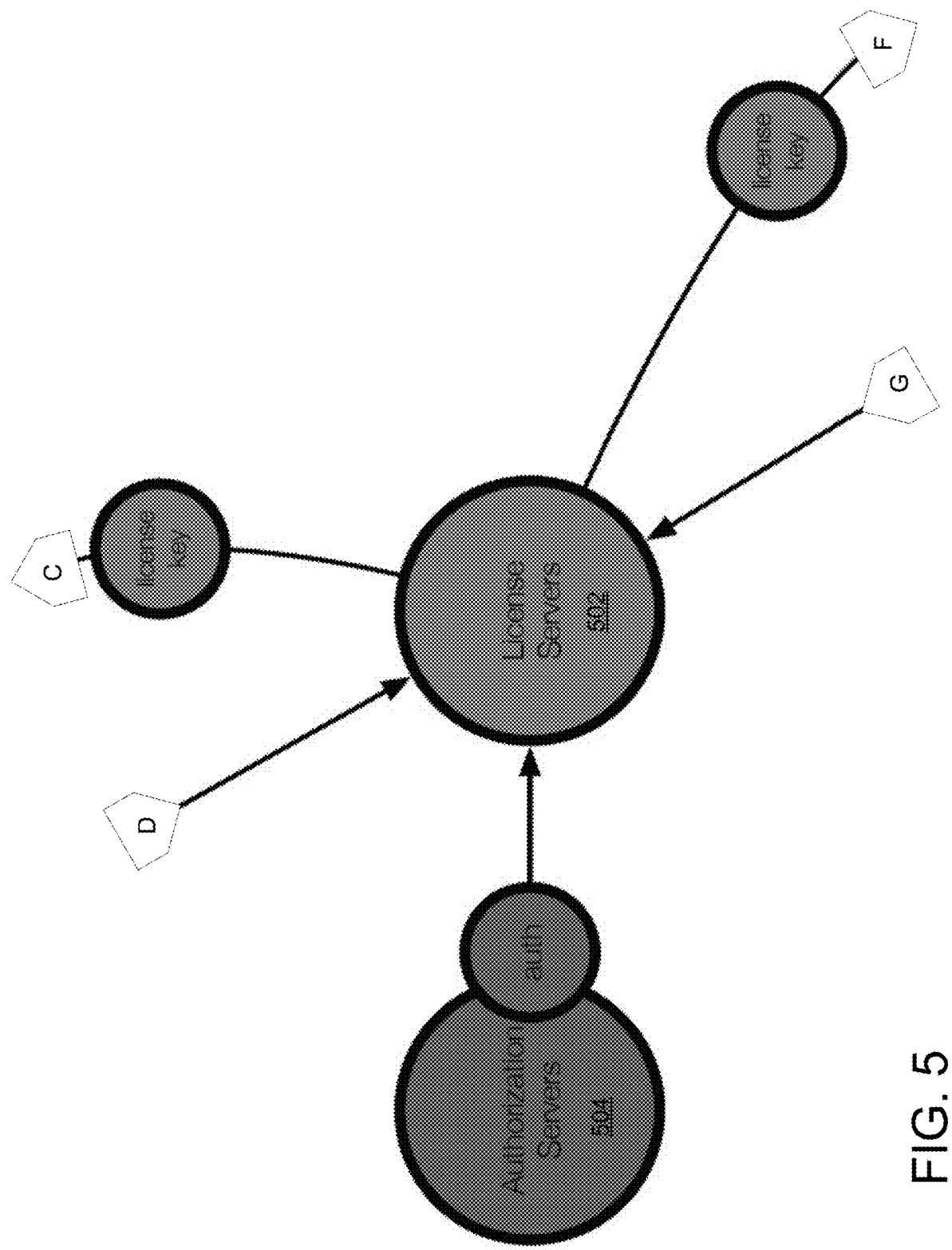

With reference to FIG. 5, the system may comprise a license server 502 and/or an authorization server 504. The license server 502 and/or authorization server 504 may set, monitor, or enforce entitlements for shared content. As will be described in further detail below, the shared content (e.g., a 20 second video clip of a soccer match) may have the same protection and/or entitlements as the original content (e.g., the video of the entire soccer match).

Figure 6:
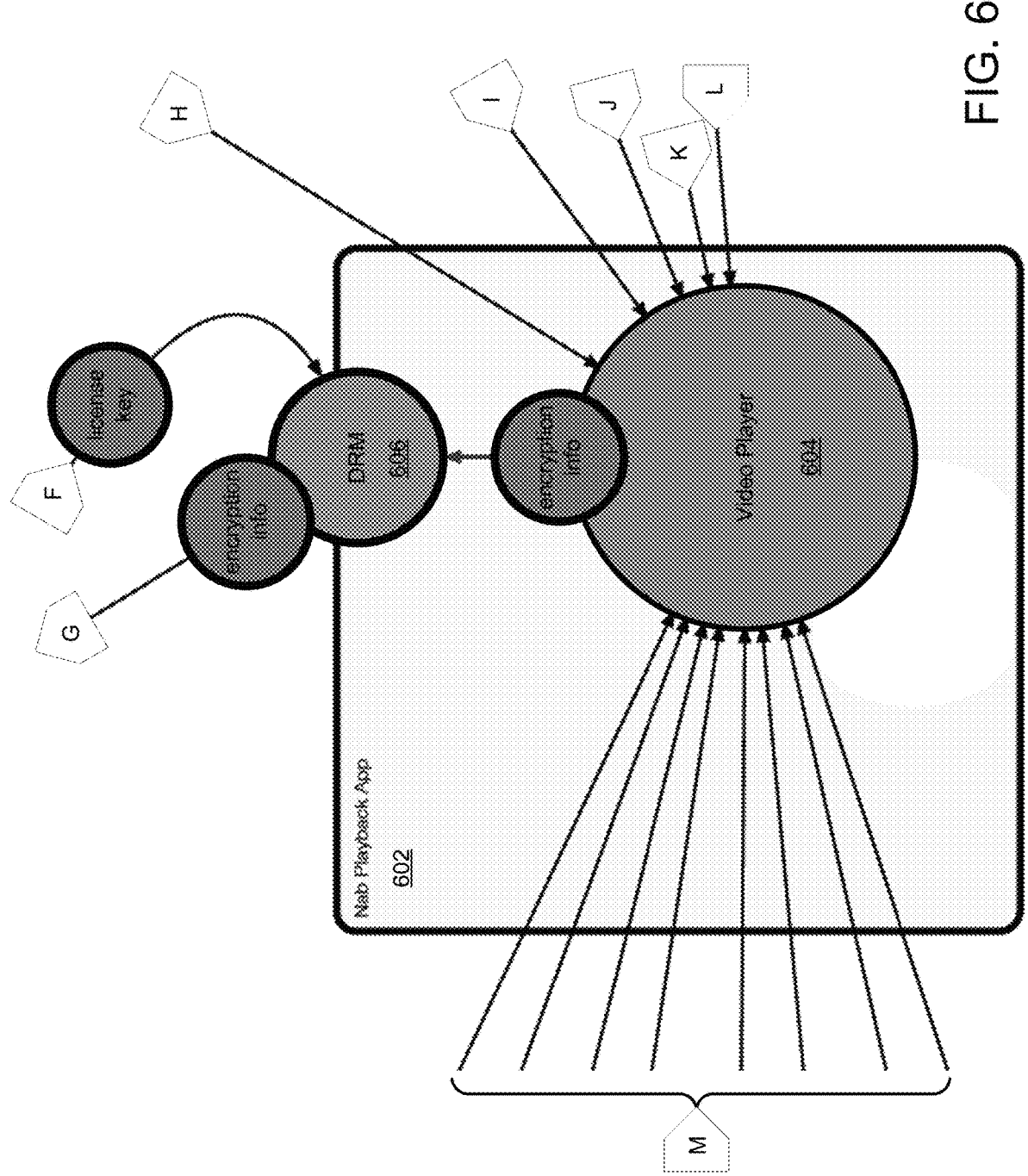

With reference to FIG. 6, the system may comprise a second device 602, which may also comprise any of the user devices illustrated in FIG. 1, such as the personal computer 114, laptop computer 115, or wireless device 116. The second device 602, like the first device 402, may run an application configured to select, share, and/or access content.

Figure 7:
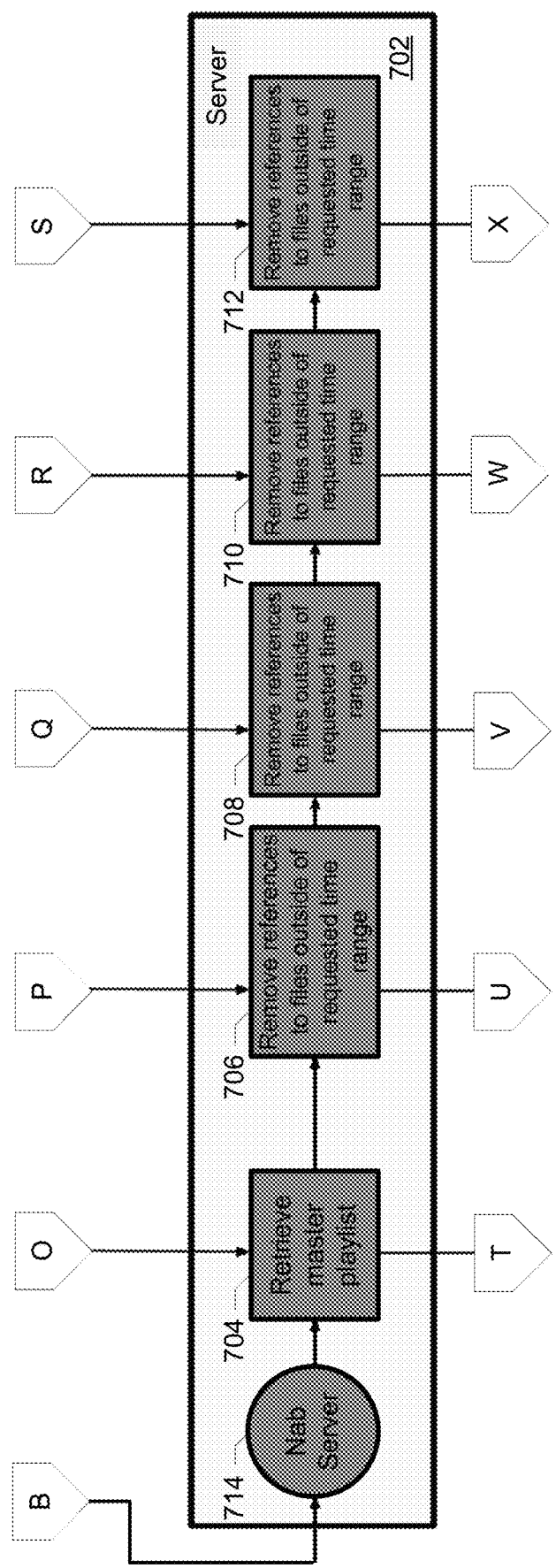
Figure 8:
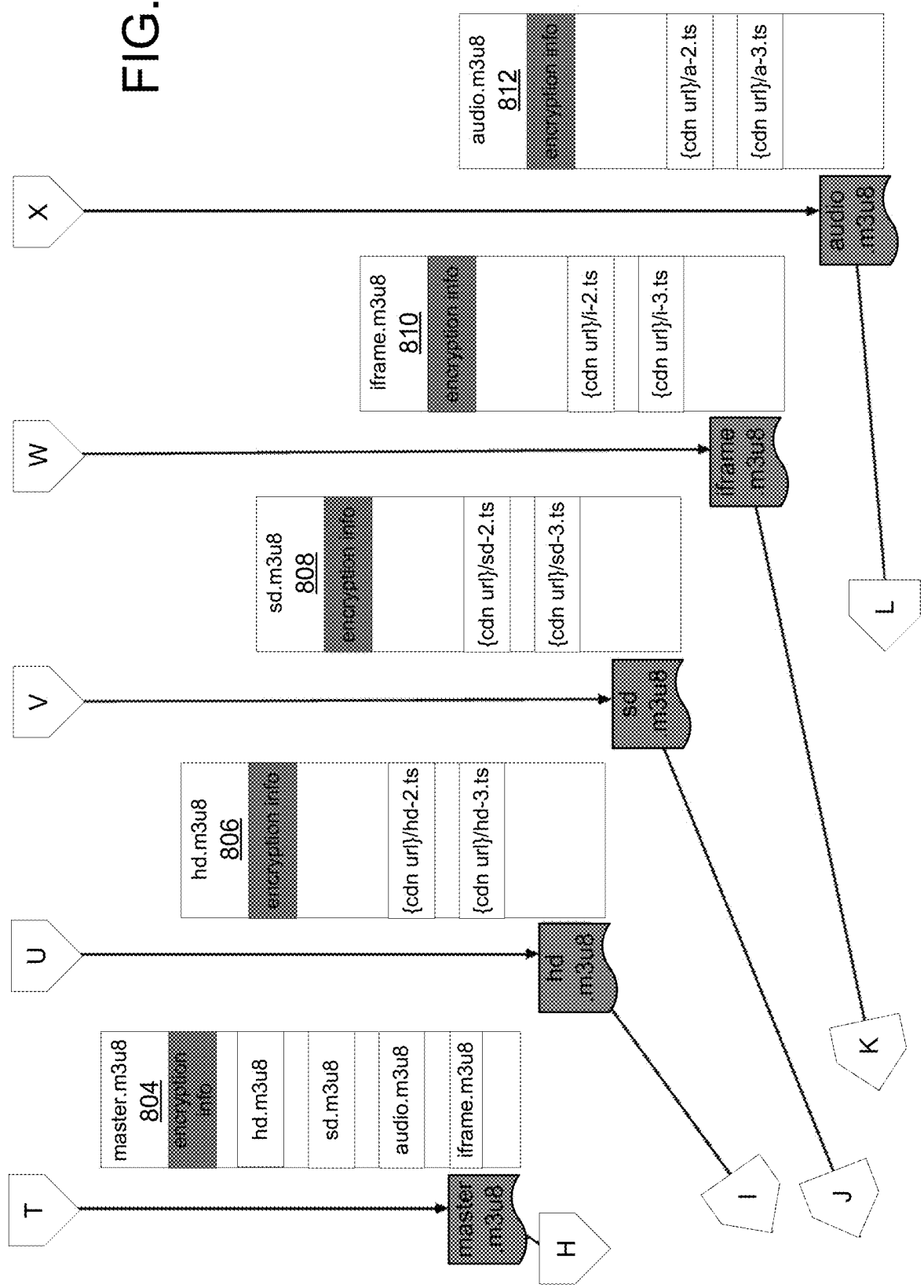

With reference to FIG. 7, the system may comprise a server 702, such as a nab server. The server 702 may receive content playlists from the CDN 202 and information for the shared (e.g., nabbed) content (e.g., start time, end time, and/or duration of the shared content) from the first device 402. The server 702 may be used to share a portion of a content taken (e.g., nabbed) from a larger portion of content. For example, the larger portion of content may comprise an entire television show or an entire movie, and the nabbed content may comprise a segment or portion of the television show or movie. The server 702 may also generate modified (e.g., reduced) playlists by removing references in the received content playlists that are outside of the range of the nabbed content. FIG. 8 illustrates exemplary modified playlists. The server 702 may send the modified playlists to the second device 602, so that the second device 602 may access the nabbed content. The server 702 is not limited to sending the modified playlist to just one device, and may send the modified playlist to any number of devices. For example, the server 702 may publish the modified playlist so that a plurality of devices may access the nabbed content.

The system illustrated in FIGS. 2-8 will now be described in greater detail. With reference to FIG. 2, the system may comprise the CDN 202. The CDN 202 may store content and/or deliver content to the homes 102 and/or any of the devices in the homes 102. While the user devices in FIG. 1 are illustrated as being inside the home 102*a*, they may be used outside of the home 102*a*. Accordingly, the content may also be delivered to devices outside of the home 102*a*. In some aspects, one or more elements of the distribution network illustrated in FIG. 1 (e.g., the local office 103, the network 109, or the line 101) may be part of the CDN 202 and be used to deliver content.

The CDN 202 store and/or deliver various types of data, such as high definition video segments (e.g., hd-1, hd-2, hd-3, hd-4), standard definition video segments (e.g., sd-1, sd-2, sd-3, sd-4), audio segments (e.g., a-1, a-2, a-3, a-4), and metadata for each segment, such as inline frame (iframe) data (e.g., i-1, i-2, i3, i4). Each of the video, audio, and metadata segments having the same numerical identifier (e.g., 1, 2, etc.) may correspond to the same portion of audiovisual content. For example, hd-1, sd-1, a-1, and i-1 may comprise the first five seconds of a video. Similarly, hd-2, sd-2, a-2, and i-2 may comprise the second five seconds of the video. Each segment may have a fixed duration, such as 1 second, 2 seconds, 5 seconds, or any other time duration. Each segment may also comprise a single image frame or a plurality of image frames (e.g., for video content). The CDN 202 may deliver one or more segments to the first device 402, as illustrated by reference arrow E. The CDN 202 may similarly deliver one or more segments to the second device 602, as illustrated by reference arrow M.

The system may comprise a video packager 204. The video packager 204 may publish content, such as video content, to the CDN 202. For example, the video packager 204 may publish the segments, such as hd-1, hd-2, hd-3, hd-4, sd-1, sd-2, sd-3, sd-4, a-1 a-2, a-3, a-4, i-1, i-2, i3, i4, to the CDN 202. The video packager 204 may also create or otherwise generate playlists for the content, such as video playlists. The video packager 204 may store the playlists at storage locations internal or external to the video packager 204. The video packager 204 may also publish the playlists to the CDN 202, as illustrated by reference arrow N. The CDN 202 may include cache storage devices to temporarily store the content segments and/or playlists. In some aspects, the video packager 204 may facilitate transmitting video over the Internet, such as via Hypertext Transfer Protocol (HTTP). For example, the video packager 204 may comprise an HTTP Live Streaming (HLS) video packager, and the HLS protocol may be used to transmit multimedia data to CDN 202 and eventually user devices.

FIG. 3 illustrates several playlists (also referred to herein as manifests), which may, for example, be published by the video packager 204 to the CDN 202. The CDN 202 may store one or more of the playlists published by the video packager 204. The CDN 202 may include a master playlist 304, which identifies or otherwise points to various other playlists (e.g., simple playlists). Those other playlists may comprise, for example, an HD playlist 306, an SD playlist 308, an iframe playlist 310, an audio playlist 312, or any other playlists not illustrated, such as another audio playlist, a closed captioning playlist, other variants of the video playlists, etc. The playlists may be formatted as an .m3u or .m3u8 file and point to one or more data locations. For example, the master .m3u8 playlist 304 may point to the four simple playlists: the hd.m3u8 playlist 306, the sd.m3u8 playlist 308, the iframe.m3u8 playlist 310, and the audio.m3u8 playlist 312. Each content item deliverable by the CDN 202, such as a movie, TV show, sports program, etc., may have its own master playlist and one or more corresponding simple playlists.

Each of the simple playlists may further comprise indexes, which point to one or more segments of HD video content, SD video content, iframe data, or audio data. For example, the hd.m3u8 playlist 306 may point to the location of each HD video segment for the content corresponding to the master.m3u8 playlist 304. Assume that the content item comprises the four HD video segments illustrated in FIG. 2 (hd-1, hd-2, hd-3, and hd-4). The corresponding hd.m3u8 playlist 306 may identify the location in the CDN 202 of each of those HD video segments, including the first HD video segment (e.g., hd-1ts), the second HD video segment (e.g., hd-2.ts), the third HD video segment (e.g., hd-3.ts), and the fourth HD video segment (e.g., hd-4.ts). The sd.m3u8 playlist 308 may identify the location of each of the SD video segments illustrated in FIG. 2, such as with the following pointers: sd-1.ts, sd-2.ts, sd-3.ts, and sd-4.ts. The iframe.m3u8 playlist 310 may identify the location of each of the iframe segments illustrated in FIG. 2, such as with the following pointers: i-1.ts, i-2.ts, i-3.ts, and i-4.ts. The audio.m3u8 playlist 312 may identify the location of each of the audio segments illustrated in FIG. 2, such as with the following pointers: a-1.ts, a-2.ts, a-3.ts, and a-4.ts. In some aspects, the pointers may be stored, transmitted, or formatted using a standard container format, such as MPEG transport stream.

Each playlist may also comprise encryption information, which may be used to define entitlements or restrictions for the content corresponding to each playlist. As will be explained in further detail below, encryption for an original content item may carry over to shared content items.

The CDN 202 may send one or more of the master and simple playlists to the server 702, as illustrated by reference arrows O, P, Q, R and S. The CDN 202 may also send one or more of the playlists to the first device 402, as illustrated by reference arrow A.

With reference to FIG. 4, the first device 402 may run an application (referred to as a nab capture app or nab playback app) configured select, share, and/or access content. The application may comprise a video player 404 that plays video on the first device 402. The video displayed on the first device 402 may be substantially synchronized in time with corresponding video displayed on another device, such as a television (not illustrated). In other words, the video displayed on the display device 112 may simultaneously be displayed on the first device 402. The first device 402 may determine the video being displayed on the display device 112 before displaying (and/or generating for display) a corresponding video on a display of the first device 402. One or more computing device described herein may determine (e.g., track) the content playing on the display device 112. The display device or a computing device connected thereto (e.g., the STB 113, gateway 111, or modem 110) may send a resume point to a central computing device. The resume point may identify the content being played back (e.g., a TV episode or a movie) and/or the point in time of the content being played back (e.g., 12 seconds from the beginning of the TV episode or movie). The first device 402 may request and receive the resume point information from the external computing device to determine the content being played back on the display device 112 and the point in time of the content. The first device 402 may determine an equivalent piece of content within the system and play back the content via, e.g., the video player 404, such that the same content is simultaneously being played back by the first device 402 and the display device 112. The first device 402 may retrieve the equivalent piece of content from the CDN 202 or a different CDN.

The video player 404 may receive video and/or audio from the CDN 202, as illustrated by reference arrow E. The video player 404 may play back the received video and/or audio on the first device 402. The received video and/or audio may comprise the video and audio being simultaneously played back on the display device 112. Additionally or alternatively, the video and/or audio received by the video player 404 may comprise portions of the video and/or audio (e.g., segments or clips) played back on the display device 112.

The video player 404 may also receive playlists from the CDN 202, as illustrated by reference arrow A. The playlists may correspond to and identify the video and/or audio being played back on the display device 112 and optionally being played back on the first device 402. As previously explained, each video available from the CDN 202 may have its own playlist, such as a master playlist. In some aspects, the video and/or audio files referenced in the received playlists may be delivered to the video player 404 of the first device 402.

As the user of the first device 402 watches the video displayed on the display device 112, the user may desire to share a portion of the video (e.g., a video clip) with others. The user may use the first device 402 to select and share the video portion with others. In near real-time, the user may pick up the first device 402 and initiate the content sharing application. The application may recognize, over a network connection with the display device 112 (or one of the devices 110, 111, and 113 connected to the display device 112), such as an IP connection over Wi-Fi, the content that is being displayed on the display device 112 (e.g., the channel that the user is watching). For example, the display device 112 and the first device 402 may communicate with a shared service and/or server, which may communicate to the first device 402 the content being displayed on the display device 112.

Figure 11:
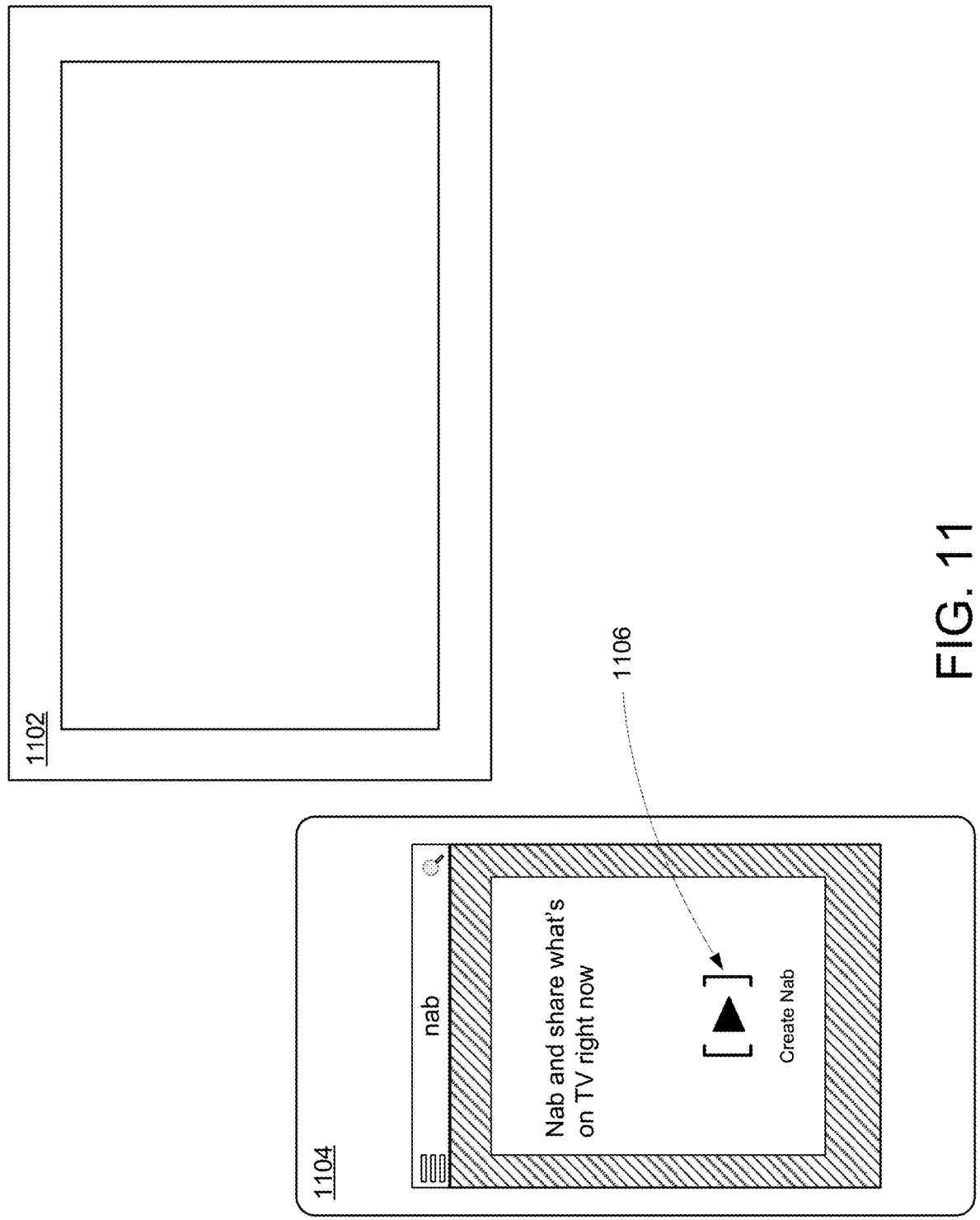
FIG. 11 illustrates an example device for selecting content to share according to one or more illustrative aspects of the disclosure.

FIG. 11 illustrates an example device 1104 for selecting content to share according to one or more illustrative aspects of the disclosure. As previously explained, the user may be watching a video on the display device 1102 (e.g., the display device 112). The user may use the first device 1104 (e.g., the first device 402 illustrated in FIG. 4) to share a portion of the video being displayed on the display device 1102. The nab application on the first device 1104 may display a message indicating that the user has the option to share with other users a portion of the video displayed on the display device 1102 (and optionally displayed on the first device 1104). For example, the message may state "Nab and share what's on TV right now." The first device 1104 may also display an option 1106 for the user to create a clip of the video. If the user selects the option 1106, the first device 1104 may initiate the creation of a video clip.

Figure 12:
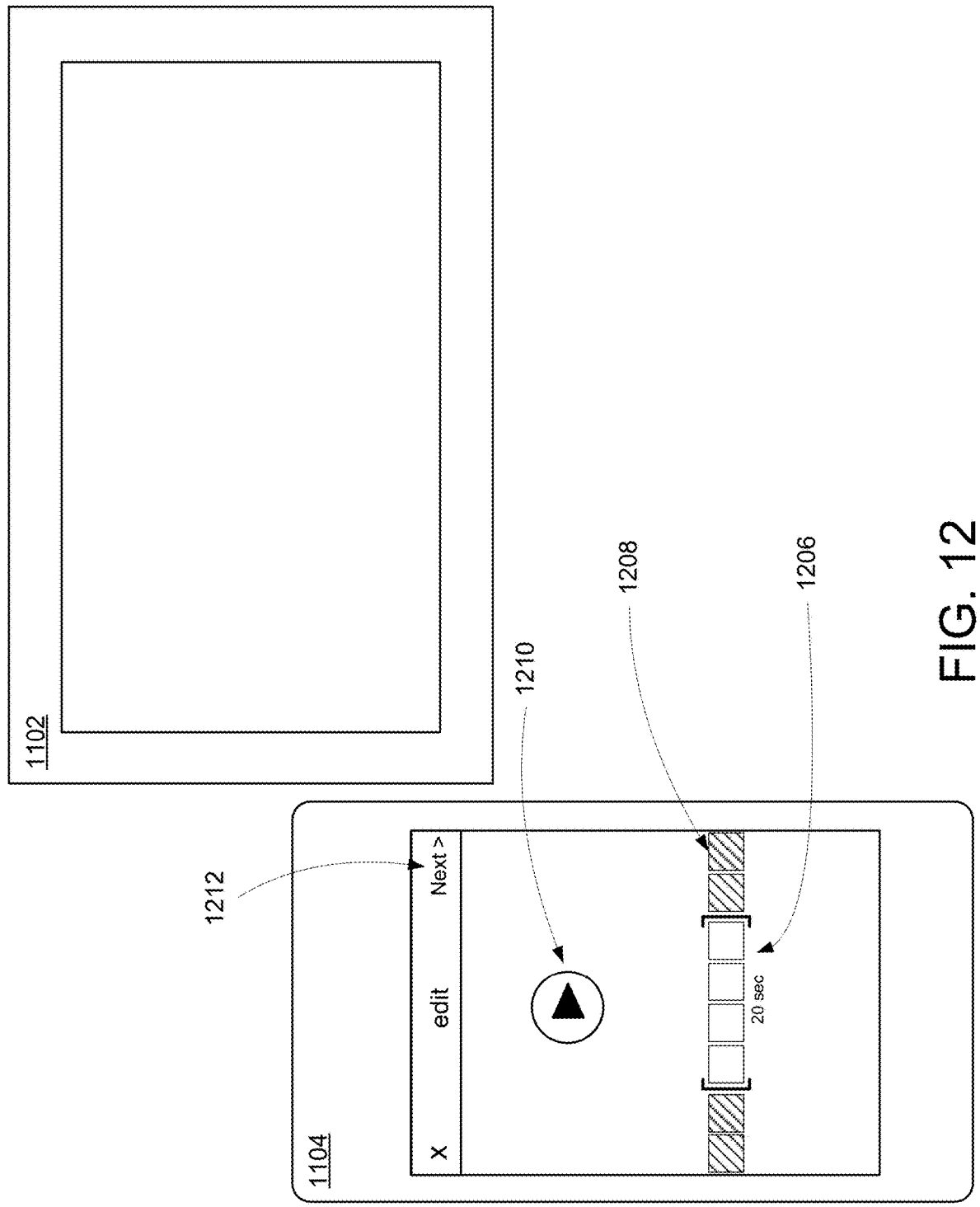
FIG. 12 illustrates an example device for editing selected content to share according to one or more illustrative aspects of the disclosure.

FIG. 12 illustrates an example device 1104 for editing selected content to share according to one or more illustrative aspects of the disclosure. In particular, the first device 1104 may generate and/or display a screen for editing a portion of content (e.g., a video clip) to share with one or more other users. The edit screen may display 1206 the length of the video clip (e.g., 20 seconds). One or more still frames from the selected video clip may also be displayed. For example, the first device 1104 may display four still frames selected from the 20 second video clip. The four frames may comprise the first frame of each of four 5 second segments forming the 20 second video clip. As another example, the four frames may comprise the last frame of each of the four 5 second segments forming the 20 second video clip or any intermediate segments.

In some aspects, the device 1104 may present the user with an option to select the overall length of the video clip based on discrete segments. For example, the discrete segments illustrated in FIG. 12 comprise clips that are each five seconds long. Thus, the user may select an overall video clip length of 5, 10, 15, 20, 25, 30, etc. seconds. The length of each discrete segment is not limited to 5 seconds and may comprise any length, such as 1 second, 2 seconds, 4 seconds, 8 seconds, or any other length of time. A frame from each discrete segment, such as the first frame, the last frame, or a frame in between may be displayed 1206 on the edit screen, as previously explained.

The edit screen may optionally display 1208 frames that the user has not selected, but that are adjacent to the frames that the user has selected. For example, the edit screen illustrated in FIG. 12 displays 4 additional unselected segments, two subsequent to the selected 20 second clip and two prior to the selected 20 second clip. Frames from unselected segments may be visually distinguished on the display of the first device 1104 from frames from selected segments. For example, the frames from the selected segments may be highlighted, whereas frames from the unselected segments might not be. Additionally or alternatively, frames from the unselected segments may be grayed out, have less contrast, or otherwise be made to appear in the background relative to the selected segments. As yet another example, frames from the unselected segments may be smaller in size than frames from the selected segments. The frames from the selected segments may optionally be identified by brackets or other dividers from frames from the unselected segments. As the user increases the length of the selected video clip 1206 by including additional segments in the selected video clip, the previously unselected frames may be included with the selected frames. For example, the user may use the touchscreen display of the first device 1104 to slide the brackets illustrated in FIG. 12 to the left or right to include or exclude additional segments from the selected video clip.

The edit screen may also display an option 1210 that, when selected by the user, causes the first device 1104 to play the selected video clip (e.g., the 20 second clip) back to the user on the display of the first device 1104. The edit screen may also display options for the user to rewind, fast forward, and/or pause the 20 second video clip during playback (not illustrated). Once the user has selected the desired video clip to edit, send, and/or share, the user may select the next button 1212 to edit, send, and/or share the selected clip.

Returning to FIG. 4, a nab client component 406 of the nab application running on the first device 402 may send information for the video clip to the server 702 illustrated in FIG. 7. Sending the information may be in response to the selection of the next button 1212 illustrated in FIG. 12. The information may identify a playlist for the content corresponding to the video clip selected by the user (e.g., the full video, audio, etc.), such as a master playlist. For example, the video may comprise a soccer match between two teams, Team 1 and Team 2, and the selected video clip may comprise a portion of the soccer match, such as a scene of a goal scored by one of the players during the soccer match. The nab client component 406 may send a playlist (or an identifier for the playlist) for the soccer match to the server 702. As described above with reference to FIG. 2 and FIG. 3, the playlist may identify (e.g., point to) the location of content, such as the video and/or audio content provided by the CDN 202. In some aspects, the playlist may be formatted as an .m3u or .m3u8 file, as previously explained.

The first device 402 may also send information identifying the particular portion of the video selected by the user, such as the boundaries of the video clip. For example, the information may identify the start time of the video clip (the nab start time) and the length of the video clip (the nab duration). Alternatively, the information might identify the start and end times of the video clip. As will be described in further detail below with reference to FIG. 7, the server 702 may use this information to facilitate creation of modified playlists that identify a particular video clip.

The content available from the CDN 202 and/or shared by the first device 402 may be protected using encryption and/or entitlements (e.g., digital rights management (DRM), licenses, and the like). The video player 404 may send encryption information for the selected video clip to the DRM component 408 of the nab application. For example, assume that a first user desires to share with a second user 20 seconds of a soccer match. The video player 404 of the first user's device (first device 402) may send encryption information for the soccer match to the DRM component 408. The encryption information may be used to indicate the location in the network of decryption information. The DRM component 408 may forward the encryption information to the license server(s) 502 illustrated in FIG. 5, as indicated by reference arrow D. With reference to FIG. 5, the license server 502 may be configured to manage licenses and/or encryption information for the content available from the CDN 202 and/or content being shared between devices. The license server 502 may optionally communicate with an authorization server 504 to determine whether a particular device and/or user is entitled to access content, such as an entire video clip or a portion of a video clip.

In some aspects, the nabbed content (e.g., the video clip) and the original content (e.g., the entire video) may use the same entitlements or restrictions. Accordingly, the nabbed content and the original content may use the same protection scheme because encryption information may be preserved when nabbed content is shared with other users. That is, encryption information from the original playlists may be preserved in the modified playlists. As will be described in detail below, playlists for the original content may be modified by a server 702 to create modified playlists for the nabbed content. Users that are entitled (or otherwise authorized) to access the original content may be entitled to access the nabbed content. Similarly, users that are not entitled to access the original content might not be entitled to access the nabbed content. In some aspects, a time limit may be added to the nabbed content. For example, if a user is not entitled to access the original content, the user may nevertheless be granted permission to access the nabbed content for a limited amount of time. The time limit may be included in the authorization server 504 based on, for example, business rules. The license server 502 may communicate with the authorization server 504 to determine the time limit for each nabbed content item. The license key sent to the first device, second device, or any other device attempting to access the nabbed content may indicate the time limit.

If the license server 502 determines that a second device is entitled to access the nabbed content, the license server 502 may send a decryption key (e.g., a license key) to the second device, as indicated by reference arrow F. In some aspects, the license key may be sent to the second device in response to determining that the second device is requesting to access or otherwise view the nabbed content. In the soccer match example, the license server 502 may determine whether the second user, having a second device, is entitled to access the entire soccer match or is entitled to access the goal clip from the soccer match for a limited amount of time. If so, the license server 502 may send a license key for the soccer match to the second device. The second device may use the license key to decrypt and access the encrypted nabbed content.

Entitlements may similarly be determined for other devices. For example, a second device 602 may send encryption information for nabbed content to the license server 502, as indicated by reference arrow G. The license server 502 and/or the authorization server 504 may determine whether the first device 402 is entitled to the content nabbed at the second device. If so, the license server 502 may send a license key for the nabbed content to the first device 402, as indicated by reference arrow C.

With reference to FIG. 6, the second device 602 (like the first device 402) may comprise an application (referred to as a nab capture app or nab playback app) configured select, share, and/or access content. The application may comprise a video player 604 that plays video on the second device 602. For example (and similar to the video player 404 of the first device 402), the video player 604 of the second device 602 may receive video and/or audio from the content delivery network 202, as illustrated by reference arrow M. The video player 604 on the second device 602 may play back the received video and audio. In some aspects, the video and audio received by the video player 604 may comprise portions of the video and audio (e.g., clips) shared by another device, such as the first device 602 or other devices.

The video player 604 may receive modified playlists from the server 702, as illustrated by reference arrows H, I, J, K, and L. The video player 604 may also receive playlists directly from the CDN 202. As previously explained, the playlists may correspond to and identify the video (or portions thereof) available from the CDN 202. If the second device is accessing nabbed content, the playlists received by the video player 604 may comprise playlists modified by the server 702 (illustrated in FIG. 7). These playlists may reference the portions of content shared by the first device 402. In other words, the server 702 may remove references to files outside the time range of the nabbed content (e.g., files outside a 20 second clip taken from a 90 minute soccer match), as will be described below with reference to FIGS. 7-9.

Figure 9:
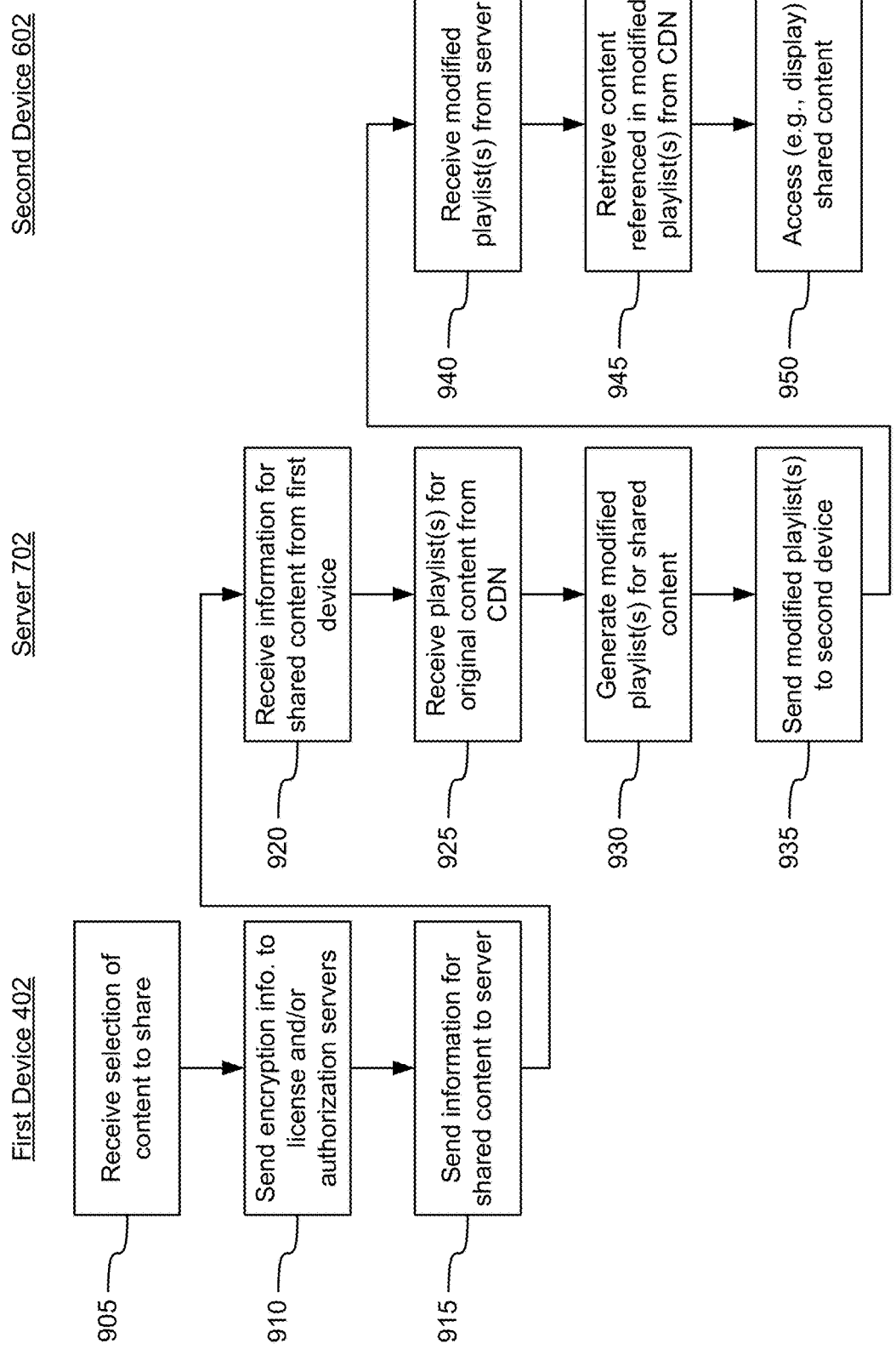
FIG. 9 illustrates an example method of selecting and sharing content according to one or more illustrative aspects of the disclosure.

FIG. 9 illustrates an example method of selecting and sharing content with other users according to one or more illustrative aspects of the disclosure. In step 905, the first device 402 may receive (e.g., from a user of the first device 402) a selection of content to share. For example, the user may select a clip taken from a longer video (e.g., an entire video) to share with other users. The user may also select the start time of the shared content, the end time of the shared content, and/or the duration of the shared content, as previously explained.

In step 910, the first device 402 may send encryption information for the shared content to the license server 502 and/or the authorization server 504, as previously explained with reference to FIG. 4 and FIG. 5. In some aspects, the shared content may have the same entitlements and/or restrictions as the original content. In other aspects, the entitlements and/or restrictions may be different. The license server 502 and/or the authorization server 504 may provide license keys to devices that are entitled to access the shared content.

In step 915, the first device 402 may send information for the shared content to the server 702. As previously explained, the information may identify the original content corresponding to the shared content, a start time of the shared content relative to the original content, an end time of the shared content, and/or a duration of the shared content. In step 920, the server 702 may receive the information for the shared content from the first device 402. With brief reference to FIG. 7, step 920 of FIG. 9 may correspond to reference arrow B, with the server 702 receiving the information from the first device 402.

In step 925, the server 702 may receive one or more playlist(s) for the original content from the CDN 202. The server 702 may contact (e.g., query) the CDN 202, and receive the playlist(s) in response to the server 702 receiving the information from the first device 402 in step 920. Additionally or alternatively, the server 702 may receive the playlist(s) in response to the server 702 sending a request to the CDN 202 for playlists corresponding to the information received from the first device 402. With reference to FIG. 7, the server 702 may receive a master playlist 704 (e.g., master.m3u8) from the CDN 202, as indicated by reference arrow O. As previously explained, the master playlist 704 may correspond to the original content corresponding to the content being shared. The master playlist 704 may reference one or more other playlists, such as different components of the original content (e.g., HD video, SD video, iframe data, audio data, etc.). The server 702 may receive the HD video playlist 706 (e.g., hd.m3u8) from the CDN 202, as indicated by reference arrow P. The server 702 may receive the SD video playlist 708 (e.g., sd.m3u8) from the CDN 202, as indicated by reference arrow Q. The server 702 may receive the iframe data playlist 710 (e.g., iframe.m3u8) from the CDN 202, as indicated by reference arrow R. The server 702 may receive the audio data playlist 712 (e.g., audio.m3u8) from the CDN 202, as indicated by reference arrow S.

Returning to FIG. 9, in step 930, the server 702 may generate (e.g., format) one or more modified playlist(s) for the shared content, based on the information received from the first device 402 and the playlists for the original content received from the CDN 202. In particular, the server 702 may remove references to files outside the time range indicated by the information received from the first device 402. As a brief example, assume that the original content comprises a television show that is 30 minutes long, and the user has selected to share a 30 second clip from the television show. The playlist(s) for the television show may reference each video, audio, metadata, etc. segment of the 30 minute television show. In order to generate modified playlist(s), the server 702 may remove references to the data segments that fall outside of the selected 30 second clip.

As another example, reference is turned to FIG. 3, which illustrates the playlists for original content available from the CDN 202. The original content may comprise a master playlist 304, which references several other playlists. As previously explained, the original content may also have an HD video playlist 306, an SD video playlist 308, an iframe data playlist 310, and an audio playlist 312. Each of these playlists may reference four segments. For example, the HD video playlist may reference hd-1.ts, hd-2.ts, hd-3.ts, and hd-4.ts, each segment corresponding to a different HD video portion of the original content. The other playlists may also each reference four segments. The use of four segments is merely exemplary, and original content may be divided into any number of segments. For example, a 30 minute (or 1800 second) TV show may be broken into 360 segments, each segment being 5 seconds long. The CDN 202 may provide the playlists to the server 702.

With reference to FIG. 8, the server 702 may remove references to segments that have not been selected for sharing by the user of the first device 402. For example, assume that the user selected to share the middle two segments of a four segment content item. In each of the playlists, the server 702 may remove references to the first segment and the fourth segment to generate a modified playlist. For example, the server 702 may remove references to hd-1.ts and hd-4.ts in the HD video playlist 306 to generate a modified HD video playlist 806. The server 702 may remove references to sd-1.ts and sd-4.ts in the SD video playlist 308 to generate a modified SD video playlist 808. The server 702 may remove references to i-1.ts and i-4.ts in the iframe playlist 310 to generate a modified iframe playlist 810. The server 702 may remove references to a-1.ts and a-4.ts in the audio playlist 812 to generate a modified audio playlist 812.

Segments that fall within the time boundaries selected by the user of the first device 402 may remain referenced in the modified playlist(s). For example, the modified HD video playlist 806 may reference hd-2.ts and hd-3.ts. The modified SD video playlist 808 may reference sd-2.ts and sd-3-ts. The modified iframe playlist 810 may reference i-2.ts and i-3.ts. The audio playlist 812 may reference a-2.ts and a-3.ts. The server 702 may generate and/or add to each playlist a link (e.g., a Uniform Resource Identifier (URI), such as a Uniform Resource Locator (URL)) to the location in the CDN 202 of the corresponding segment, as indicated by {cdn.url} illustrated in FIG. 8. The link(s) to the location(s) in the CDN 202 may be optional. In some aspects, the segments may be stored in (e.g., copied from the CDN 202 to) the server 702. Accordingly, the playlist may directly reference the segments stored in the server 702 (e.g., without the link(s) to the location(s) in the CDN 202). In other aspects, the segments might not be stored in the server 702, and the server 702 may add the link to the location in the CDN 202 of each segment. The link may be used by devices to access the video clip. The server 702 may generate a link for each playlist or a single link for all of the playlists corresponding to the shared content.

In some aspects, the server 702 might not modify the master playlist 804 (e.g., master.m3u8) because the referenced playlists 806, 808, 810, and 812 might incorporate the modifications. The server 702 may send the master playlist 804, the modified HD playlist 806, the modified SD playlist 808, the modified iframe playlist 810, and the modified audio playlist 812 to the second device 602, as indicated by reference arrows H, I, J, K, and L. Sending the playlists is also illustrated as step 935 in FIG. 9.

In step 940, the second device 602 may receive the modified playlist(s) from the server 702. The second device 602 may optionally verify that the second user is entitled to access the nabbed content referenced in the modified playlist(s). For example, the second device 602 may communicate with the license server 502 and/or the authorization server 504 to determine whether it is entitled to access the nabbed content. If the second device 602 is entitled to access the nabbed content, the license server 502 may return a license key that the second device 602 may use to decrypt protected data, such as the segments referenced in the received playlist(s). As previously explained, the entitlements for the nabbed content may be the same as the entitlements for the original content, and the entitlement information may be preserved in the modified playlists. For example, if the second user is entitled to access HBO content (e.g., the user is subscribed to HBO as part of his or her television package), the second user may also be entitled to access clips generated from HBO content. If, on the other hand, the second user is not entitled to HBO content, the second device 602 may display a message to the second user indicating that the second user does not have access to the HBO clip published by the first user. In some aspects, content protection for the original content might not carry over to the nabbed content. For example, even if the second user is not an HBO subscriber, the second user might be entitled to access a clip generated from HBO content nabbed by the first user. Access to the nabbed content may be time limited.

In step 945, the second device 602 may retrieve from the CDN 202 the segments identified in the modified playlist(s). With reference to FIG. 6, the video player 604 of the second device 602 may, for example, download or stream from the CDN 202 the segments identified in the playlists(s), as indicated by reference arrow M. In step 950, the second device 602 may access the shared content, such as by displaying the content on a display of the second device 602, or another display device.

Figure 10:
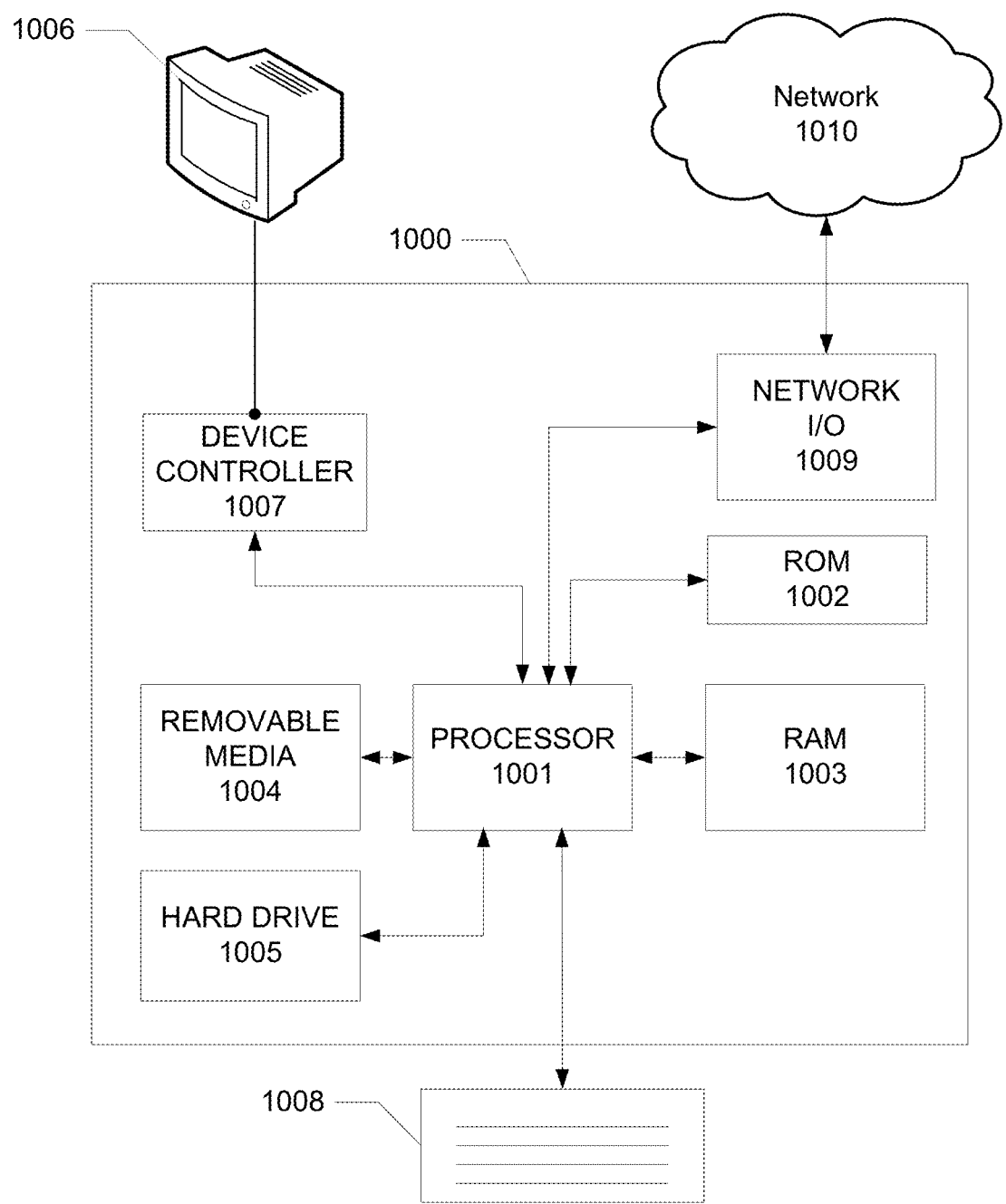
FIG. 10 illustrates an example hardware and software platform on which various elements described herein can be implemented.

FIG. 10 illustrates general hardware and software elements that can be used to implement any of the various computing devices (e.g., terminal devices, remote control devices, user devices, display devices, servers, etc.) discussed herein. The computing device 1000 may include one or more processors 1001, which may execute instructions of a computer program to perform any of the features described herein. The instructions may be stored in any type of computer-readable medium or memory, to configure the operation of the processor 1001. For example, instructions may be stored in a read-only memory (ROM) 1002, random access memory (RAM) 1003, hard drive, removable media 1004, such as a Universal Serial Bus (USB) drive, compact disk (CD) or digital versatile disk (DVD), floppy disk drive, or any other desired electronic storage medium. Instructions may also be stored in an attached (or internal) hard drive 1005. The computing device 1000 may include one or more output devices, such as a display 1006 (or an external television), and may include one or more output device controllers 1007, such as a video processor. There may also be one or more user input devices 1008, such as a remote control, keyboard, mouse, touch screen, microphone, etc.

The computing device 1000 may also include one or more network interfaces 1009, such as input/output circuits (such as a network card) to communicate with an external network 1010. The interface 1009 may be a wired interface, wireless interface, or a combination of the two. In some embodiments, the interface 1009 may include a modem (e.g., a cable modem), and the network 1010 may include the communication links 101 discussed above, the external network 109, an in-home network, a provider's wireless, coaxial, fiber, or hybrid fiber/coaxial distribution system (e.g., a DOCSIS network), or any other desired network. The computing device 1000 may communicate with the external networks 1010 or other devices using one or more communication protocols, such as wired communication protocols and wireless communication protocols (e.g., Wi-Fi, Bluetooth, ZigBee, Z-Wave, etc.).

Figure 13:
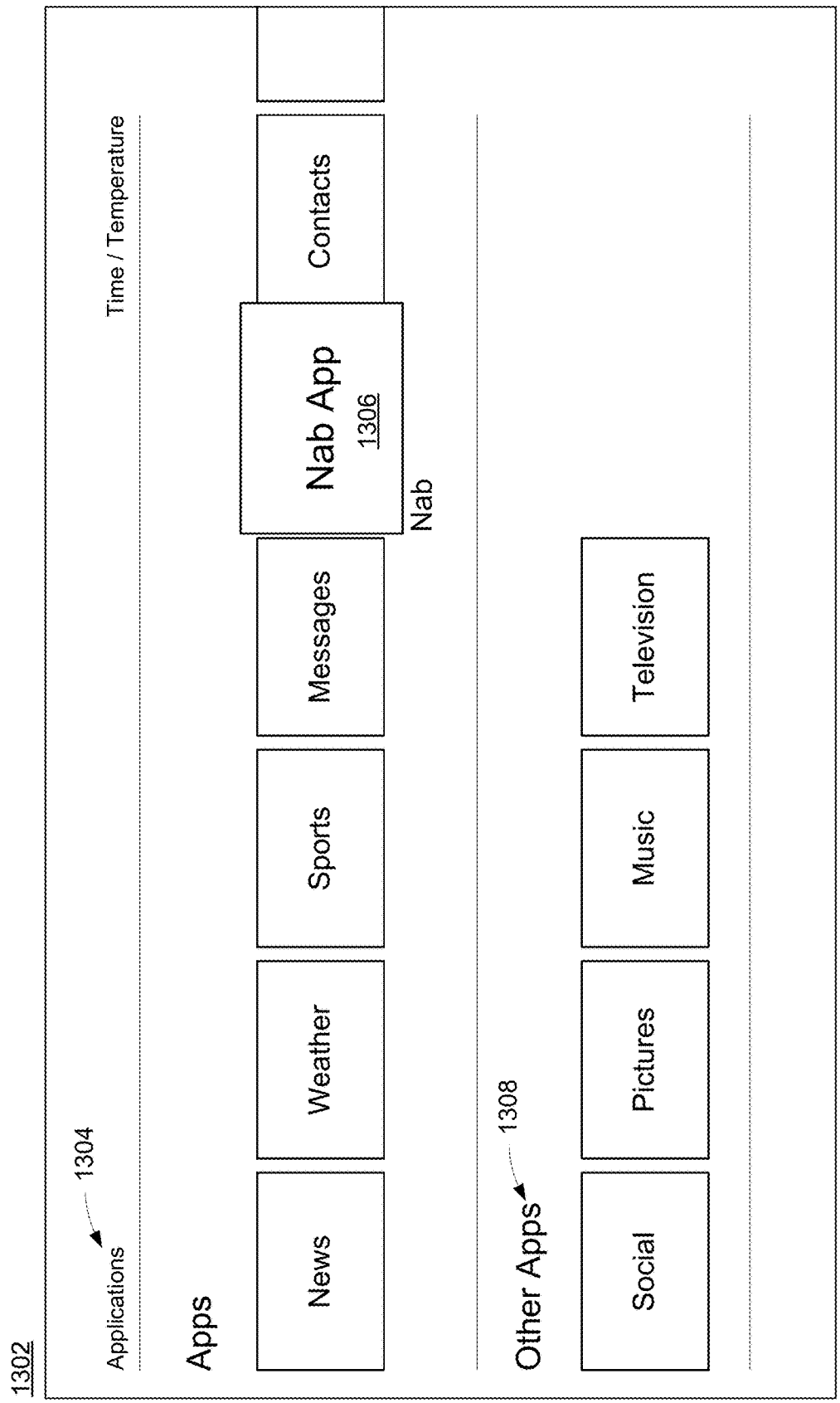
FIG. 13 illustrates an example display screen for displaying applications, including a content sharing application, according to one or more illustrative aspects of the disclosure.

FIG. 13 illustrates an example display screen 1302 for displaying applications, including a content sharing application (e.g., nab app 1306), according to one or more illustrative aspects of the disclosure. The screen 1302 (or any of the display screens described herein) may be displayed on any device having a display screen or on a separate display screen, such as the display 1102 illustrated in FIG. 11, the device 1104 illustrated in FIG. 11, the first device 402 illustrated in FIG. 4, and/or the second device 602 illustrated in FIG. 6. The display screen 1302 may display a list 1304 of applications available to a user of the device. For example, the applications may include a news app, weather app, sports app, messages app, and a contacts app, among other apps. The list 1304 may also include a nab app 1306. If any additional applications are available, they may optionally be listed in a second listing 1308 of applications. A user may access the nab app 1306 by selecting the corresponding icon on the display screen 1302.

Figure 14:
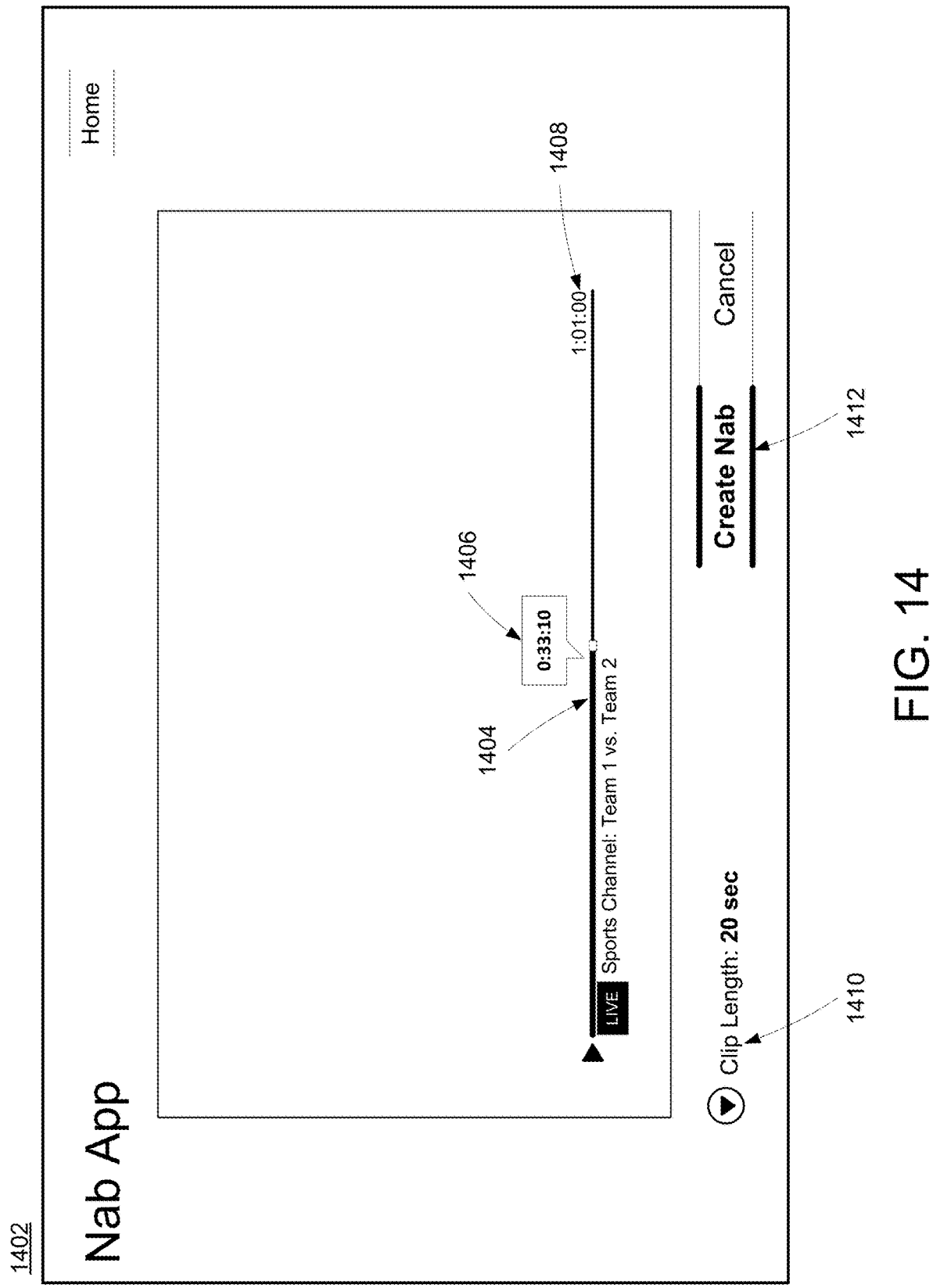
FIG. 14 illustrates an example display screen for creating content to share according to one or more illustrative aspects of the disclosure.

FIG. 14 illustrates an example display screen 1402 for creating content to share according to one or more illustrative aspects of the disclosure. In some aspects, selection of the icon 1306 in FIG. 13 may cause the screen 1402 to be displayed on the user device. The user may be watching a sports channel on the first device 402 and/or on the user's television 112 or other display device. For example, FIG. 14 illustrates a soccer match between Team 1 and Team 2 being broadcast live on the sports channel. The screen 1402 may highlight 1404 how far into the program the user currently is. The screen 1402 may also indicate 1406 the corresponding time of the program (e.g., 33 minutes, 10 seconds into the program). The screen 1402 may indicate the overall length 1408 of the program (e.g., 1 hour, 1 minute, and 0 seconds). In some aspects, the user may rewind, fast forward, or otherwise jump to another portion of the program. The user many return to the live program at any time by, for example, selecting the play button or scrolling to the current time.

The screen 1402 may display an option 1410 that allows the user to select the length of the clip to nab. In some aspects, the selectable length may be in fixed increments. For example, the segments of the program may be fixed at 5 second intervals, and the user may be able to select a clip having a length of 5 seconds, 10 seconds, 15 seconds, 20 seconds, 25 seconds, etc. In other aspects, the length of the clip might not be in fixed increments, and the user may be able to select a clip of any length. For example, the user may select a clip of 7 seconds, 20 seconds, 2 minutes, etc. The user may also be able to select the starting point for the clip. For example, the user may scroll the indicator 1406 to any portion of the video program to set the starting point (e.g., using a rewind button, a fast forward button, by manually moving the indicator 1406, etc.). The user may optionally select the end time of the video clip instead of selecting the clip length. Once the user has selected the start time for the video clip and the duration (or end time) of the video clip, the user may select the option 1412 to create a nab of the video having the selected start time and duration or end time.

Figure 15:
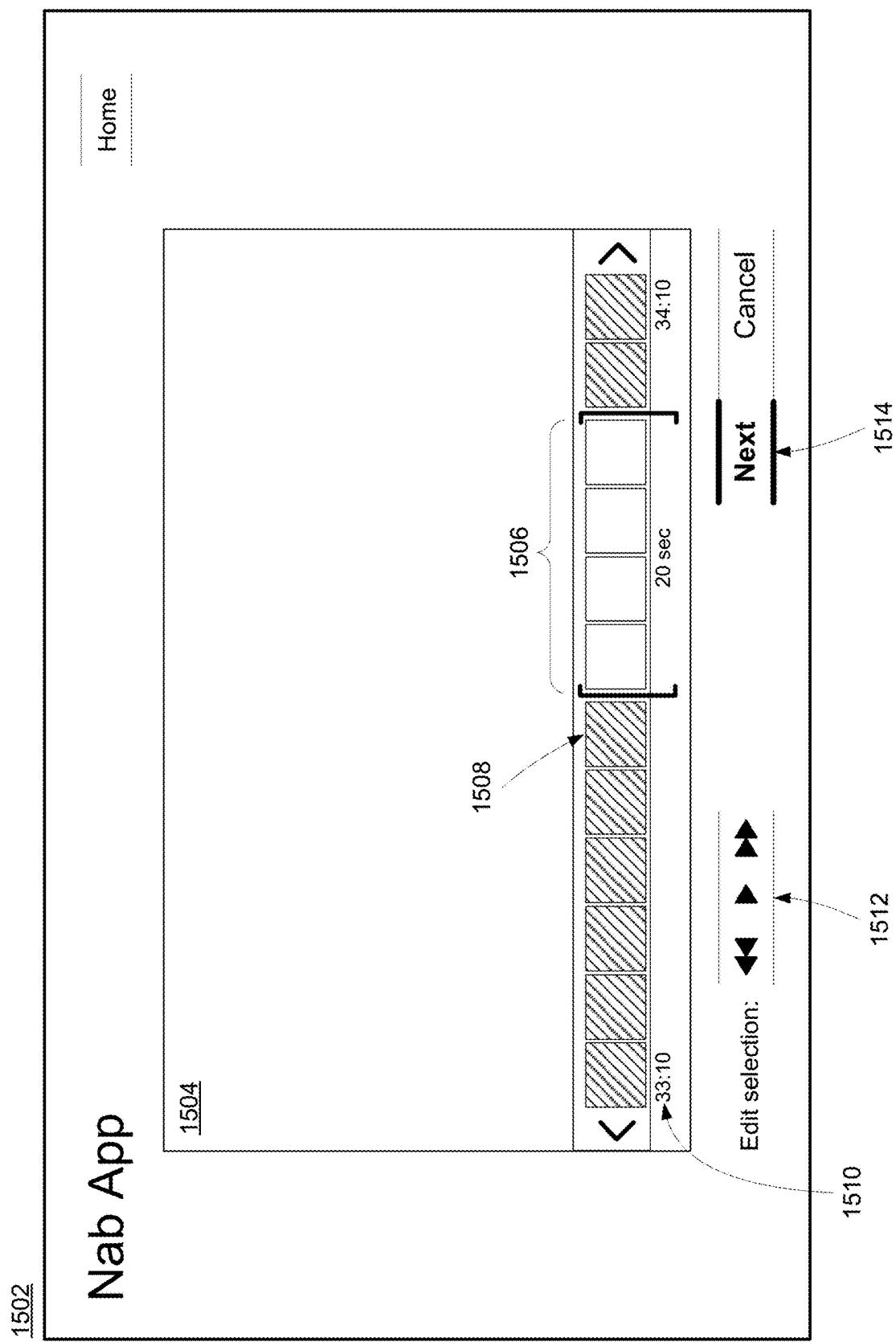
FIG. 15 illustrates an example display screen for editing content to share according to one or more illustrative aspects of the disclosure.

FIG. 15 illustrates an example display screen 1502 for editing content to share according to one or more illustrative aspects of the disclosure. In some aspects, selecting the create nab option 1412 illustrated in FIG. 14 may cause the screen 1502 to be displayed. The display screen 1504 of the nab application may display the selected video clip. Four frames 1506 may be used to display a 20 second clip, such as in 5 second segments. As previously explained, the frame displayed for each segment may comprise the first frame in the segment, the last frame in the segment, or any other frame in between. Frames 1508 for the segments not included in the 20 second clip may be grayed out or otherwise distinguished from the frames of the selected clip. In some aspects, the user may increase or decrease the length of the video clip by, for example, moving a bracket on either side of the selected video clip. The time of the first segment displayed on the screen 1504 may be displayed 1510 (e.g., 33:10). The time of the last segment displayed on the screen 1504 may similarly be displayed (e.g., 34:10).

FIG. 15 also illustrates options 1512 for the user to play back and/or edit the 20 second clip. For example, selection of the play button may cause the 20 second clip to play back on the display screen 1504. The user may also use the rewind or fast forward buttons to manipulate playback of the clip. In some aspects, the display screen 1502 may comprise buttons for editing the selected clip. For example, the display screen 1502 may display an option that adds future segment(s) to the clip (e.g., segments to the right of the end of the clip 1506) and an option that adds past segment(s) to the clip (e.g., segments to the left of the beginning of the clip 1506). The display screen 1502 may similarly have buttons to remove segments. The display screen 1502 may have buttons that maintain the length of the clip, but that shift the selected clip left or right. For example, the clip may currently run from 33:40 to 34:00 of the original content. The clip may be shifted to the left (e.g., to 33:35 to 33:55) or to the right (e.g., to 33:45 to 34:05) depending on the button selected. Once the user is done editing and/or reviewing the selected clip, the user may select the next option 1514. Selecting this option may cause the example display screen 1602 to be displayed.

Figure 16:
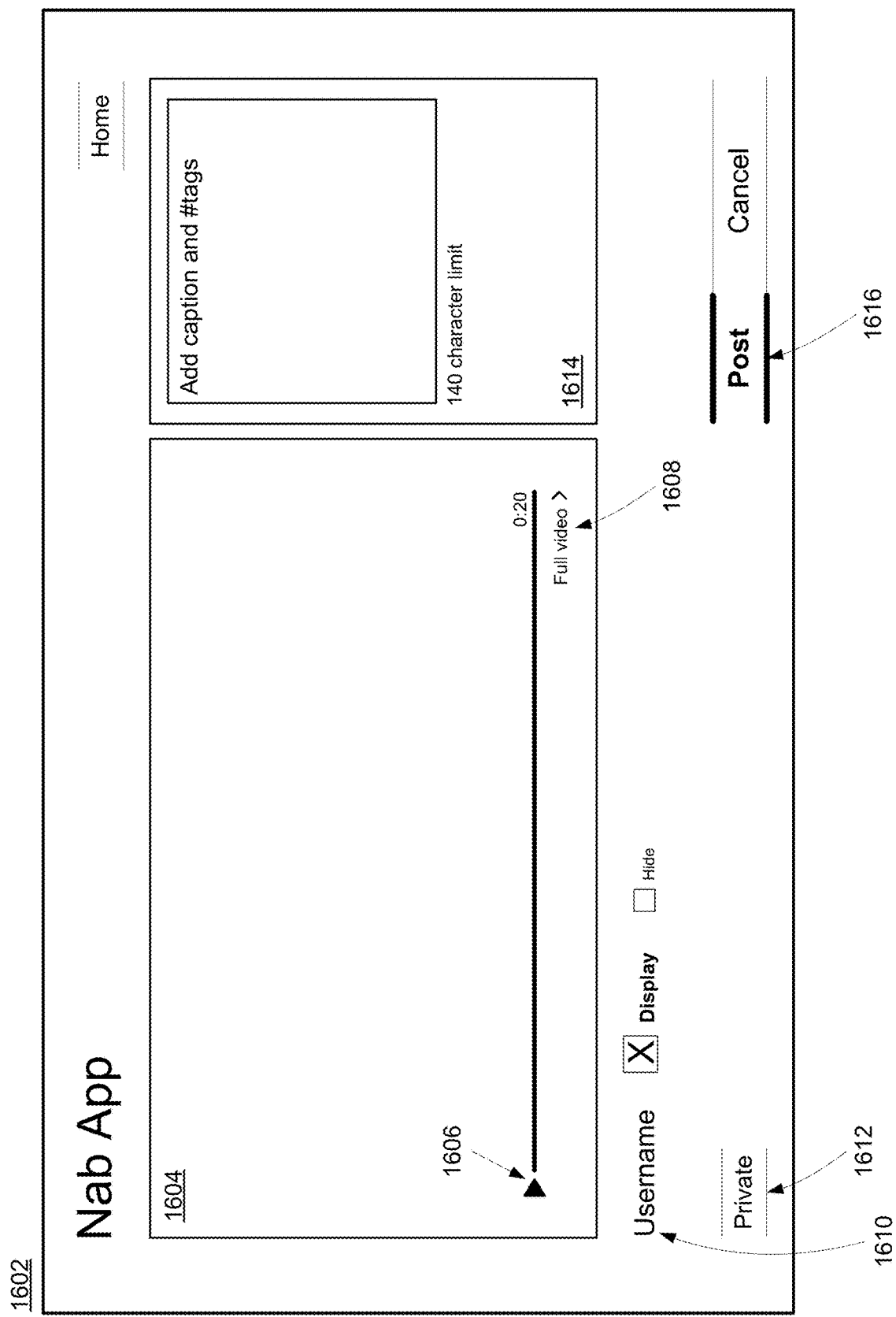
FIG. 16 illustrates an example display screen for sharing content according to one or more illustrative aspects of the disclosure.

FIG. 16 illustrates an example display screen 1602 for sharing content according to one or more illustrative aspects of the disclosure. The display screen 1604 of the nab application may display the nabbed program. The display screen 1604 may include a play button 1606, and selection of the play button 1606 may cause the device to playback the selected clip. The display screen 1604 may also comprise an option 1608 to access the full video, such as if the user desires to watch the full video or to edit the clip (e.g., shift, extend the length, decrease the length, etc.). If the user selects option 1608, the display screen 1502 illustrated in FIG. 15 may be displayed, permitting the user to edit the selected clip.

The display screen 1602 may display the user's username and/or an option 1610 for the username to be displayed, or hidden in the publication of the shared content. Currently, the user has selected to display his or her username in association with the clip. The display screen 1602 may display an option 1612 to make the video clip private. If the video clip is private, the user and/or others designated by the user (e.g., friends, family, or another selected group) may be able to access or comment on the video clip. Others might not have access to the video clip. The private option 1612 may also be used to send the video clip in a private message to another user. The display screen 1602 may also display a text (e.g., caption) box 1614, which may permit the user to enter a caption or other comment for the video clip. The comment may be shared with other users in association with the shared video clip. The display screen 1602 may include a post button 1616. Selection of the post button 1616 may cause the video clip to be published or otherwise sent to another user, such as the user of the second device 602.

Figure 17:
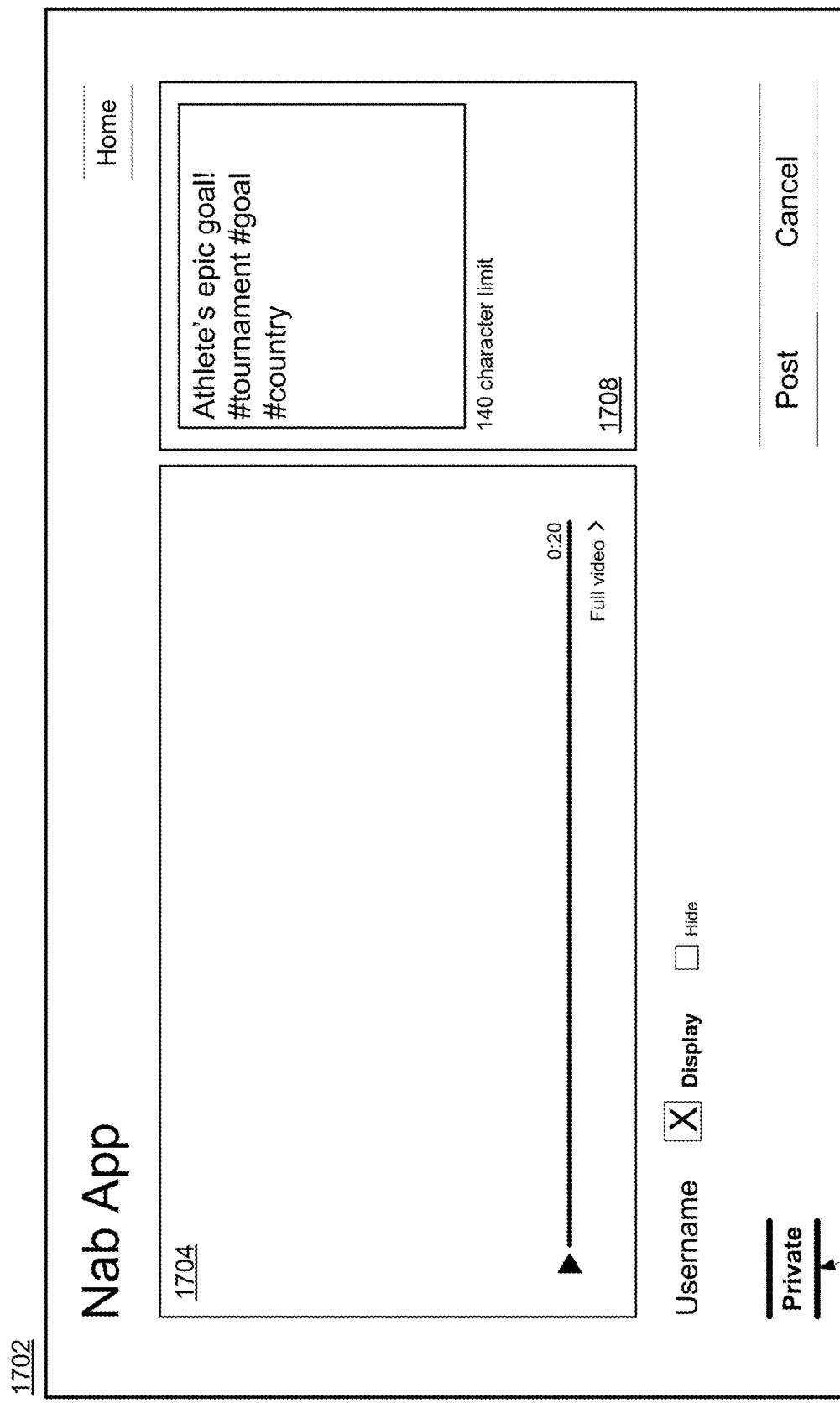
FIG. 17 illustrates another example display screen for sharing content according to one or more illustrative aspects of the disclosure.

FIG. 17 illustrates another example display screen 1702 for sharing content according to one or more illustrative aspects of the disclosure. The display screen 1704 may be similar to the display screen 1604 illustrated in FIG. 16. In FIG. 17, the user may have selected the private button 1706, and access to the video clip may be restricted to the user and/or others that the user designates. FIG. 17 also illustrates a text box 1708 showing an exemplary caption entered by the user: "Athlete's epic goal! #tournament #goal #country."

Figure 18:
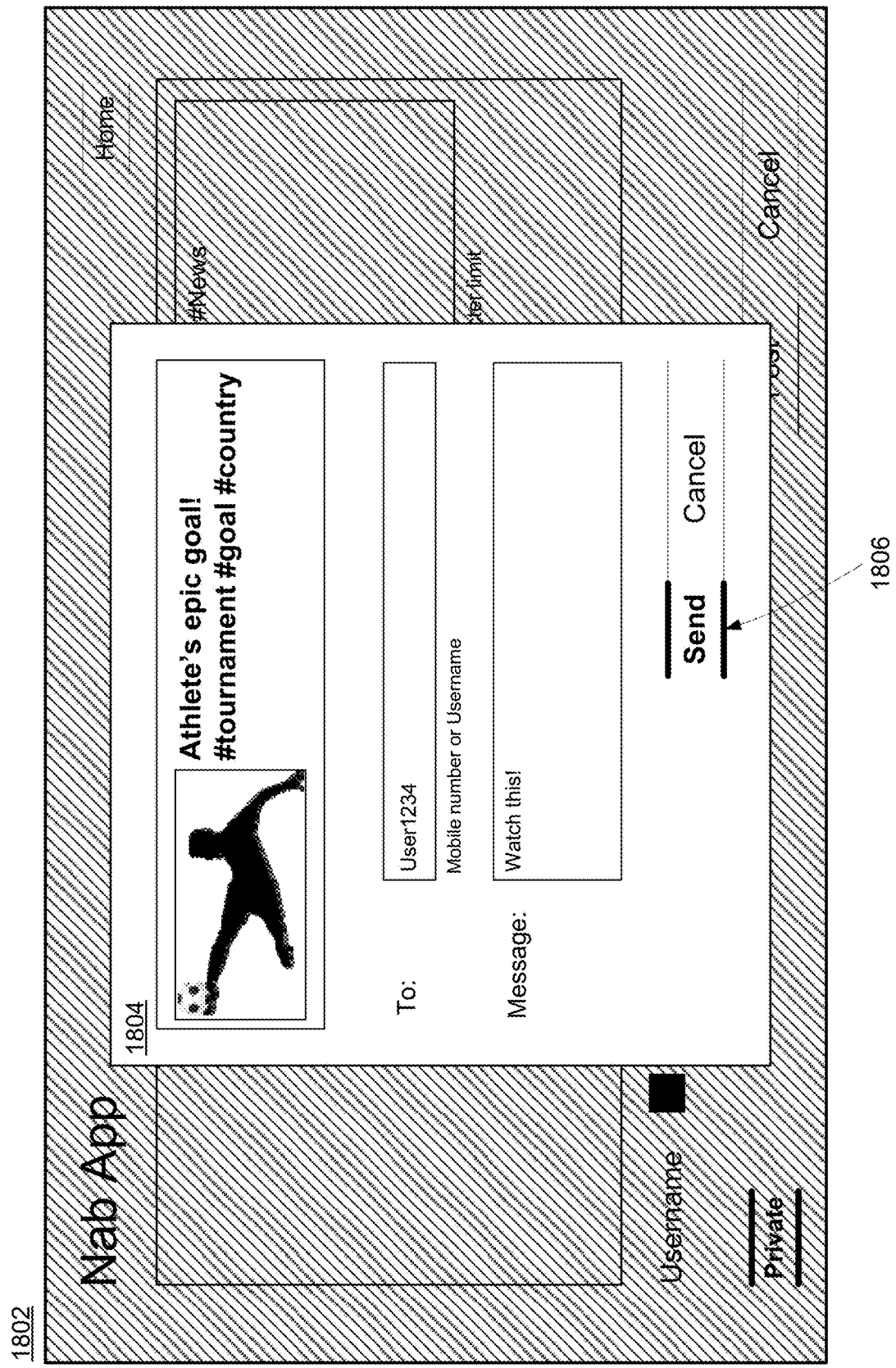
FIG. 18 illustrates an example display screen for sending content according to one or more illustrative aspects of the disclosure.

FIG. 18 illustrates an example display screen 1802 for sending content according to one or more illustrative aspects of the disclosure. In response to a selection of the private option 1706 and/or the post option illustrated in FIG. 17, the display screen 1804 may be displayed (e.g., as a pop up). The user may enter a recipient of the video clip by the recipient's unique identifier, such as a mobile number, a username (e.g., User1234), etc. The user may also include a message to User1234, such as "Watch this!" The screen 1804 may display a send option 1806, and selection of the option 1806 may cause a private message to be sent to User1234's account and/or device (e.g., the second device 602).

Figure 19:
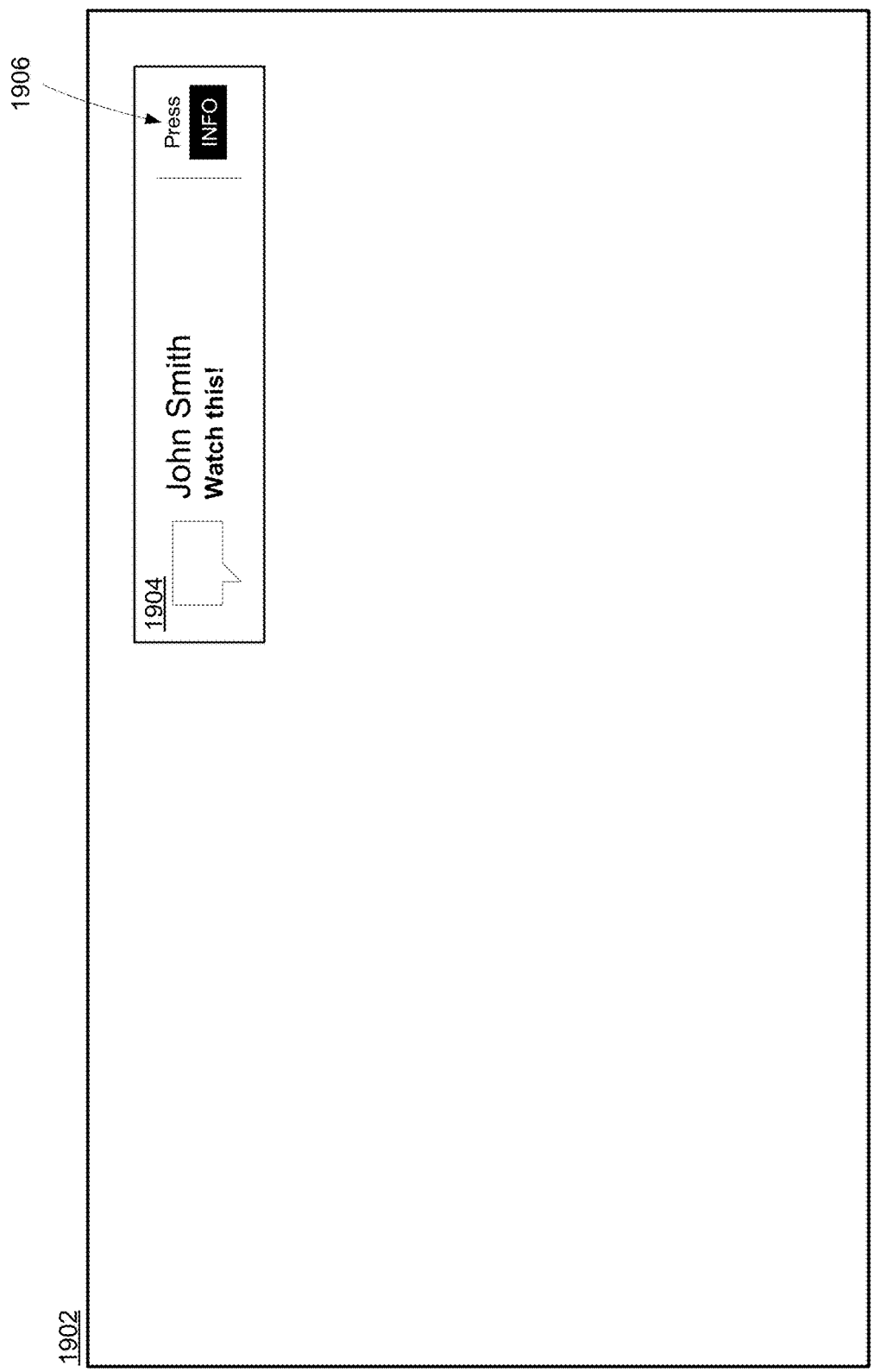
FIG. 19 illustrates an example display screen for displaying a received message according to one or more illustrative aspects of the disclosure.

FIG. 19 illustrates an example display screen 1902 for displaying a received message according to one or more illustrative aspects of the disclosure. In some aspects, the display screen 1902 may be on a second user's device, such as the second user's TV or the second device 602. The second user (User1234) may be watching a program, playing a game, accessing an application, or otherwise consuming or interacting with his or her device. During the consumption or interaction, a message 1904 may be displayed on the display 1902, such as via a popup. The message 1904 may be sent to the second user and displayed on the second user's device in response to the first user sending the private message, as illustrated in FIG. 18. The message 1904 may indicate the sender of the message (e.g., the first user, John Smith). The message 1904 may also indicate a message to the second user, such as "Watch This!" The message 1904 may comprise an option 1906 for the second user to access the video clip nabbed by the first user or to otherwise access more information on the nabbed content. In response to selecting the option 1906, the second device may display the nabbed content to the second user, as previously described.

Figure 20:
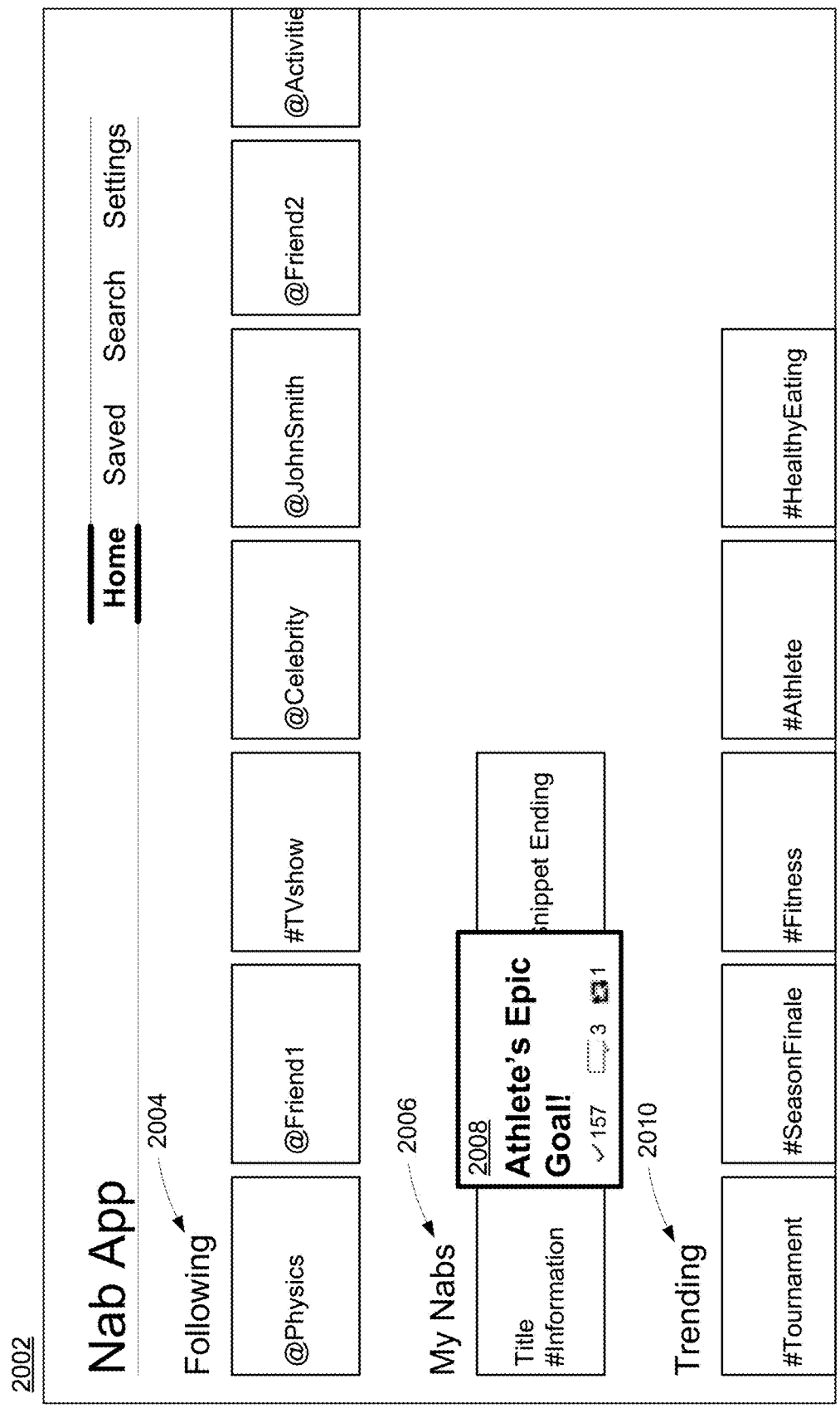
FIG. 20 illustrates an example display screen for displaying a content sharing application according to one or more illustrative aspects of the disclosure.

FIG. 20 illustrates an example display screen 2002 for displaying a content sharing application according to one or more illustrative aspects of the disclosure. The screen 2002 may display a list 2004 of users or accounts that the user of the nab application is following, such as @Physics, @Friend1, #TVshow, etc. In some aspects, the user may receive a notification if any of the followed users or accounts shares or otherwise publishes a new nab. The screen 2002 may also display a list 2006 of the user's nabs (e.g., the nabs that the user created). The list 2006 may display a first nab called "Title" and having a hashtag "#information." The list 2006 may also display the nab 2008 created by the user, as illustrated in FIG. 17 and FIG. 18, among other figures. The nab 2008 may comprise the message created by the user (e.g., "Athlete's Epic Goal"). The nab 2008 may also indicate the popularity of the nab 2008, such as the number of views or likes (e.g., 157), the number of comments (e.g., 3), and the number of reposts (e.g., 1). The screen 2002 may also display a list 2010 of trending subjects (e.g., hashtags) or subjects that are otherwise popular. Exemplary trending topics include #Tournament, #SeasonFinale, #Fitness, and the like.

Figure 21:
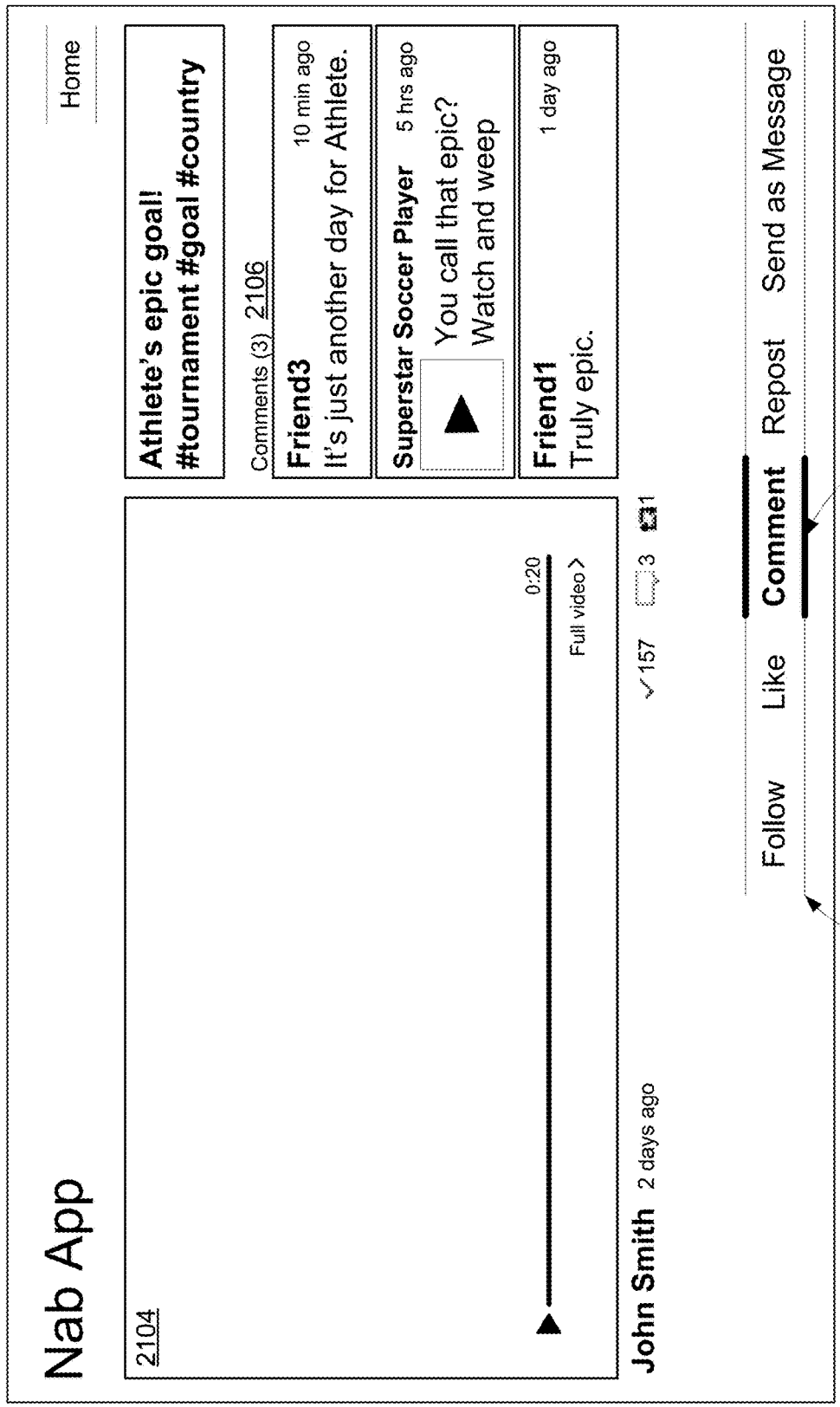
FIG. 21 illustrates an example display screen for displaying and interacting with shared content according to one or more illustrative aspects of the disclosure.

FIG. 21 illustrates an example display screen 2102 for displaying and interacting with shared content according to one or more illustrative aspects of the disclosure. The screen 2102 may be displayed if the user that created the nab (e.g., John Smith) or another user (e.g., User1234) selects an option to view or interact with the nab. For example, the screen 2102 may be displayed if User1234 selects the option 1906 illustrated in FIG. 19. The screen 2102 may also be displayed if John Smith selects the nab 2008 illustrated in FIG. 20. The screen 2102 may comprise a section 2104 configured to display the nabbed content (e.g., the 20 second video clip). The user may play back the video clip if the user is entitled to access the video clip, as previously explained.

The screen 2102 may also display comments 2106 on the video clip. For example, the comments section 2106 may display a comment made by Friend 3 ("It's just another day for Athlete."), Superstar Soccer Player ("You call that epic? Watch and weep"), and Friend 1 ("Truly epic."). The amount of time since the comment was made may also be displayed. In some aspects, users may be able to embed other videos or video clips in the comments section 2106. For example, Superstar Soccer Player has embedded a video adjacent to his comment. The screen 2102 may also include options 2108 for the user to follow the user that created the video clip, like the video clip, comment 2110 on the video clip, repost the video clip, and/or send the video clip as a message to another user. If the user selects the comment option 2110, the display screen 2202 illustrated in FIG. 22 may be displayed.

Figure 22:
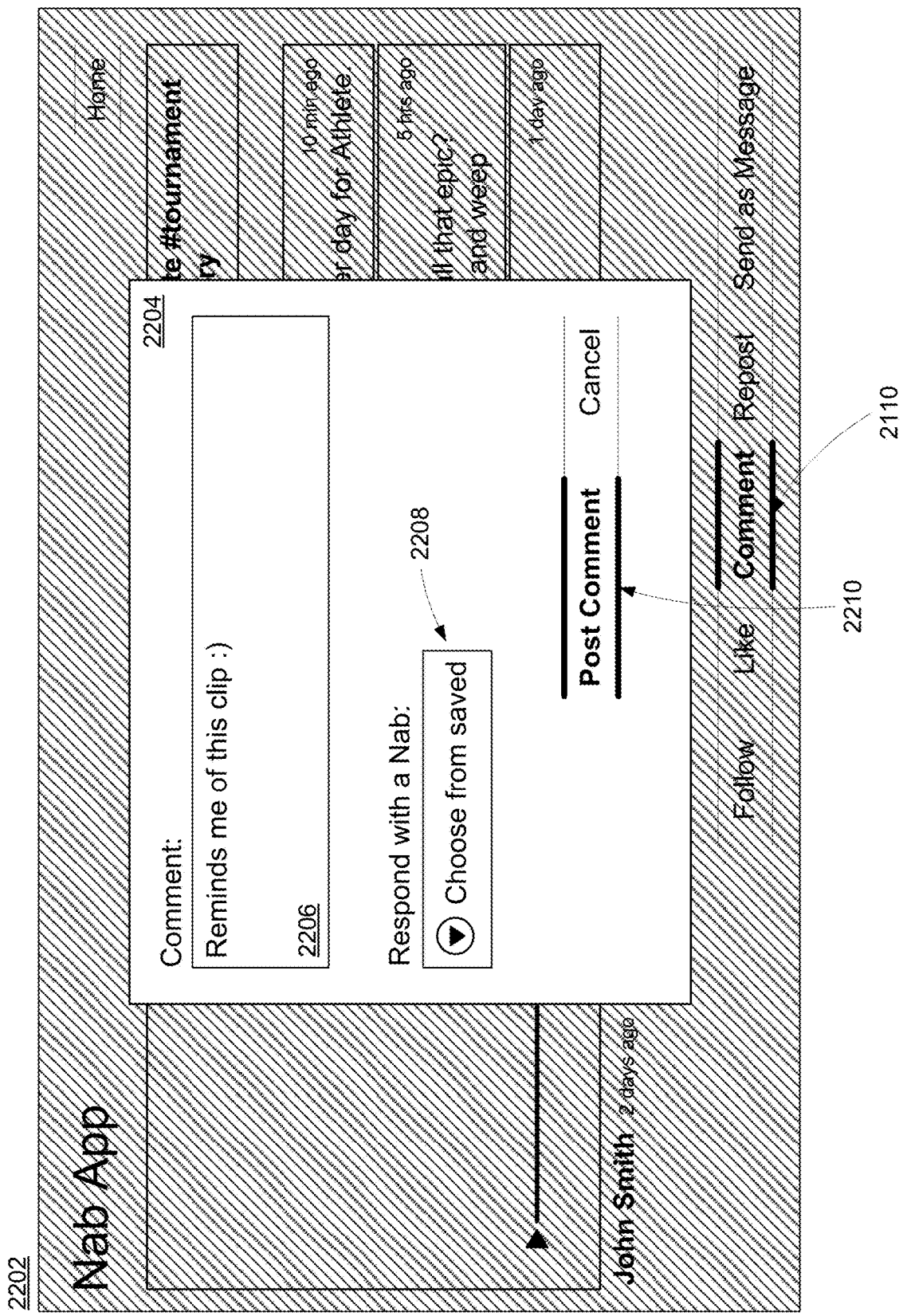
FIG. 22 illustrates an example display screen for commenting on shared content according to one or more illustrative aspects of the disclosure.

FIG. 22 illustrates an example display screen 2202 for commenting on shared content according to one or more illustrative aspects of the disclosure. In response to a selection of the comment option 2110, the nab application display screen 2102 illustrated in FIG. 21 may be grayed out, displayed in the background, or otherwise deemphasized relative to a comment block 2204 illustrated in FIG. 22. The user may input a comment in the comment box 2206 (e.g., "Reminds me of this clip :)"). The user may optionally include (e.g., embed) another video clip 2208 with his or her comment. For example, the user may select a previously saved video clip that the user created or a video clip created by another user. The comment block 2204 may include a post comment option 2210 that when selected, causes the comment to be posted to the video clip, as illustrated in FIG. 23.

Figure 23:
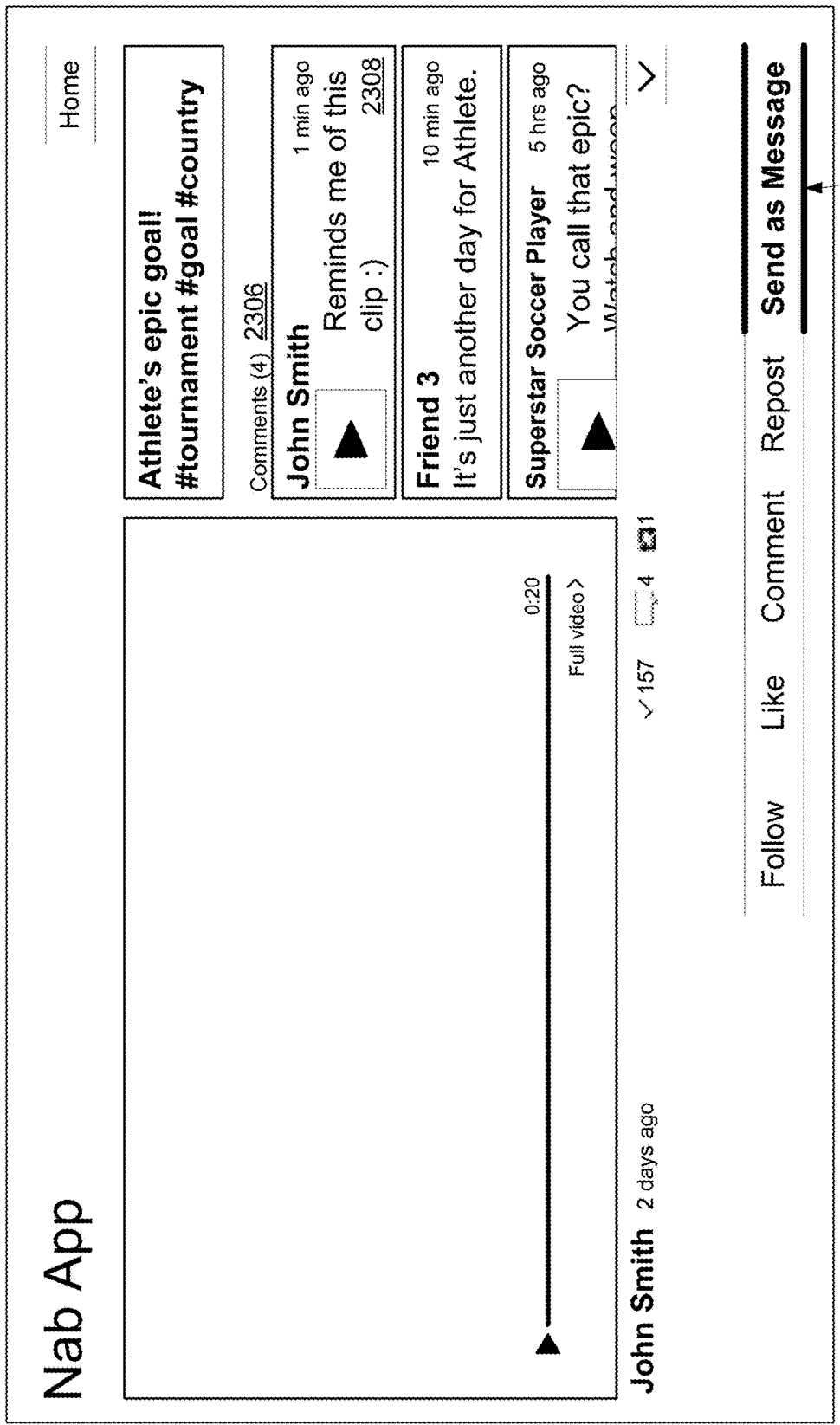
FIG. 23 illustrates an example display screen for displaying and interacting with shared content according to one or more illustrative aspects of the disclosure.

FIG. 23 illustrates an example display screen 2302 for displaying and interacting with shared content according to one or more illustrative aspects of the disclosure. The display screen 2302 is similar to the display screen 2102 illustrated in FIG. 21. However, the comment 2308 generated by the user John Smith using, for example, the display screen 2202 illustrated in FIG. 22, may be displayed in the comments section 2306. As illustrated in FIG. 23, the video clip may have 4 comments. If not all of the comments can be displayed on the display screen 2302, the user may be provided an option to scroll through the comments. The display screen 2302 may also include an option 2310 to send the video clip as a message to another user. If the user selects the option 2310, the display screen 2304 illustrated in FIG. 24 may be displayed.

Figure 24:
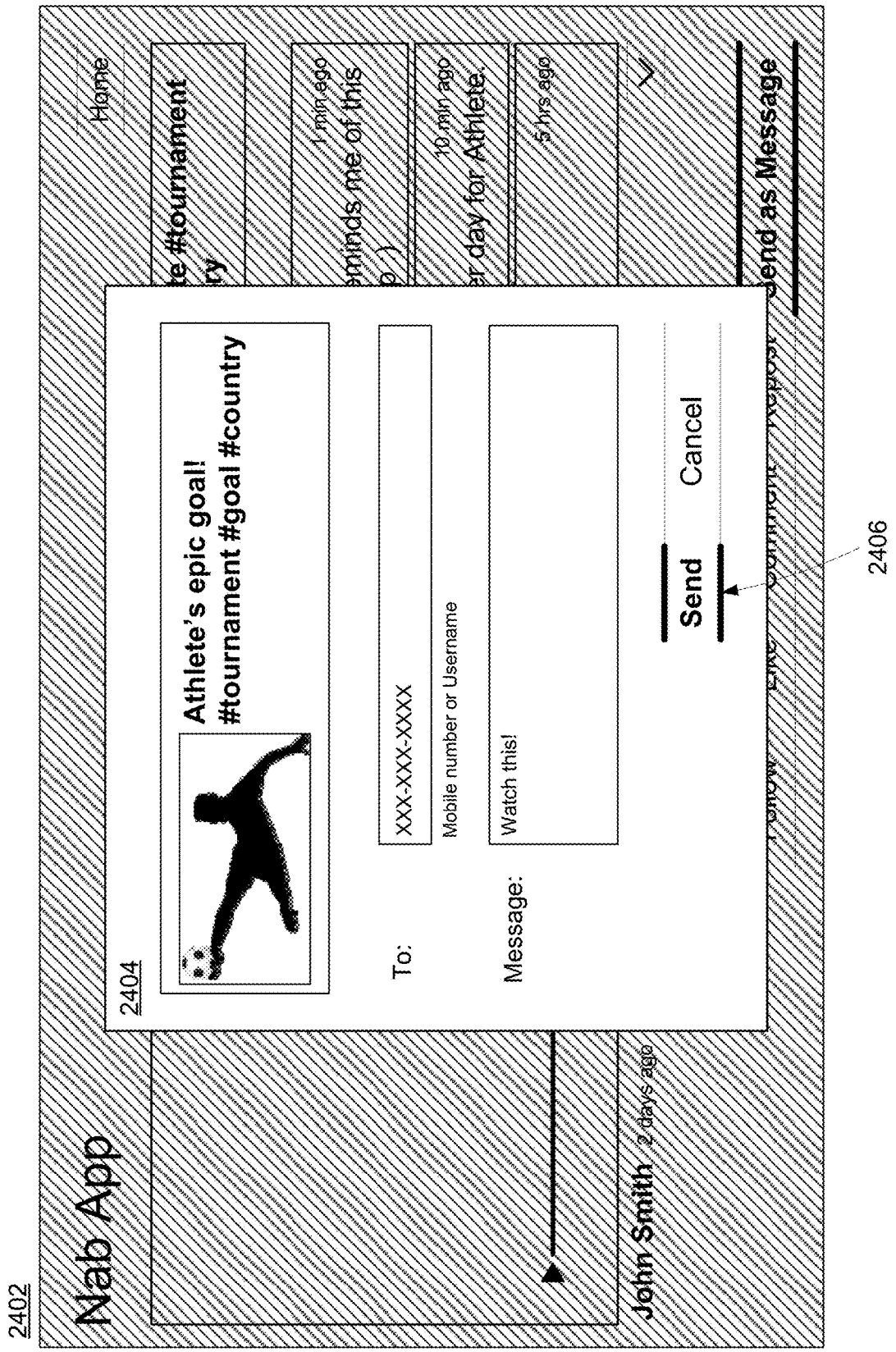
FIG. 24 illustrates an example display screen for sending content according to one or more illustrative aspects of the disclosure.

FIG. 24 illustrates an example display screen 2402 for sending content according to one or more illustrative aspects of the disclosure. In response to a selection of the send message option 2310, the nab application display screen 2302 illustrated in FIG. 23 may be grayed out, displayed in the background, or otherwise deemphasized relative to a send message block 2404, illustrated in FIG. 24. The user may add a recipient of the message by providing, for example the recipient's mobile number or username. The user may also add a message to be included with the video clip or a link to the video clip, such as "Watch This!" The send message block 2404 may display a send option 2406, and selection of the option 2406 may cause the video clip or a link of the video clip and the message to be sent to the recipient. In some aspects, the message 1904 illustrated in FIG. 19 may be displayed on the recipient's device indicating that the recipient has received the message. Additionally or alternatively, selection of the send option 2406 may cause the message to be sent to another device of the recipient, such as the recipient's mobile device (e.g., smartphone, tablet, etc.), as illustrated in FIG. 25.

Figure 25:
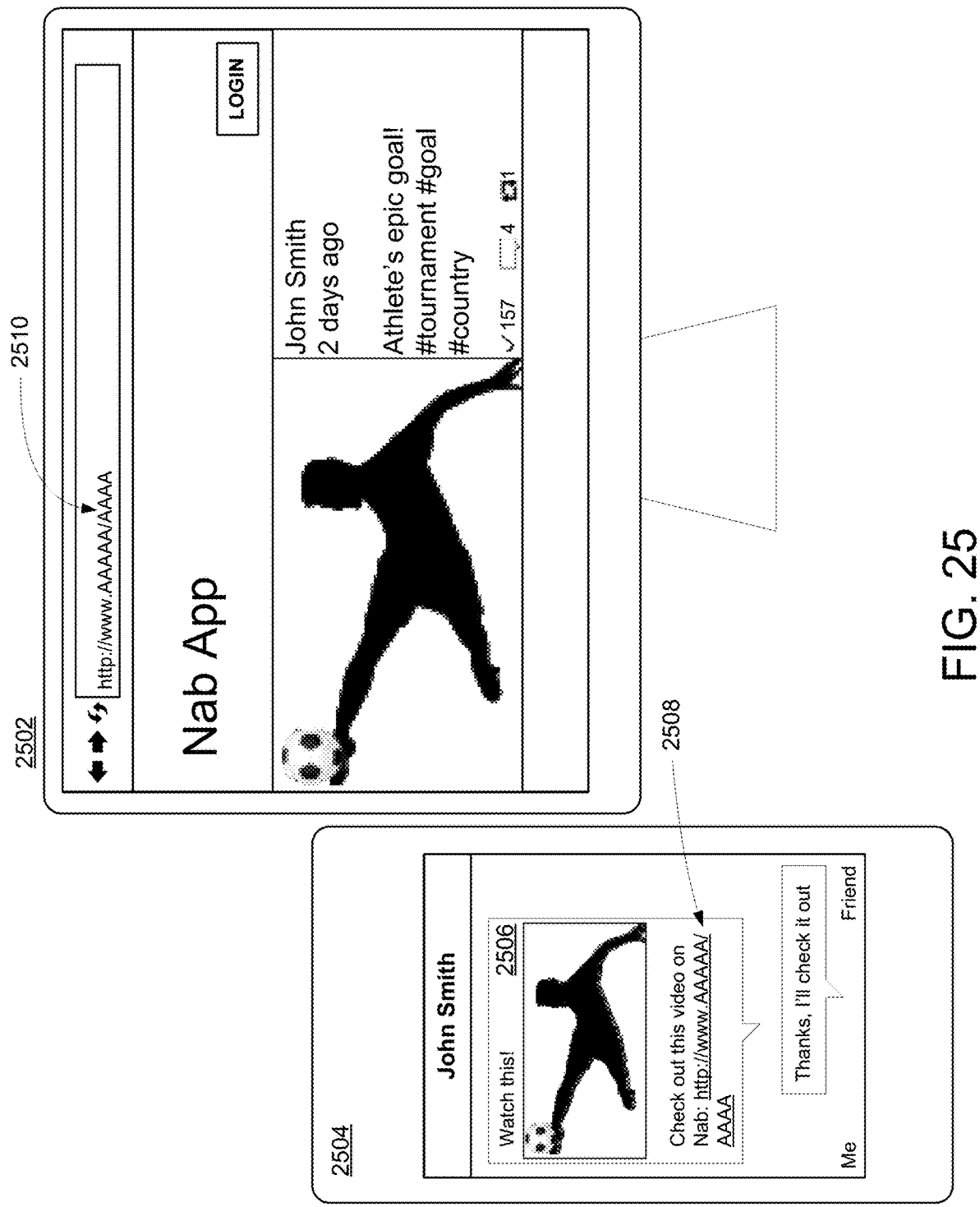
FIG. 25 illustrates example devices for accessing shared content according to one or more illustrative aspects of the disclosure.

FIG. 25 illustrates example devices 2502 and 2504 for accessing shared content according to one or more illustrative aspects of the disclosure. In particular, the shared video clip may be sent to the mobile device 2504 as a text message 2506, an email message, an in-app message, or any other type of message. The message 2506 may include a link 2508, such as a URL, to the video clip. As previously explained, the URL or other link may have been generated by the server 702, and may uniquely identify the location of the video clip or segments thereof. In response to a selection of the link 2508 on the device 2504, the device 2504 may access the shared video clip via a web browser and/or a nab app, as previously explained. Additionally or alternatively, a link 2510 may be provided to another device 2502 (e.g., a laptop computer, a desktop computer, a television, etc.), and the user may access the shared video clip via a web browser and/or a Nab application on a different device. By using a web URL, any device with a web browser may be used to access the nabbed content. The recipient may playback, comment, share, like, repost, etc. the shared video clip as previously explained.

Figure 26:
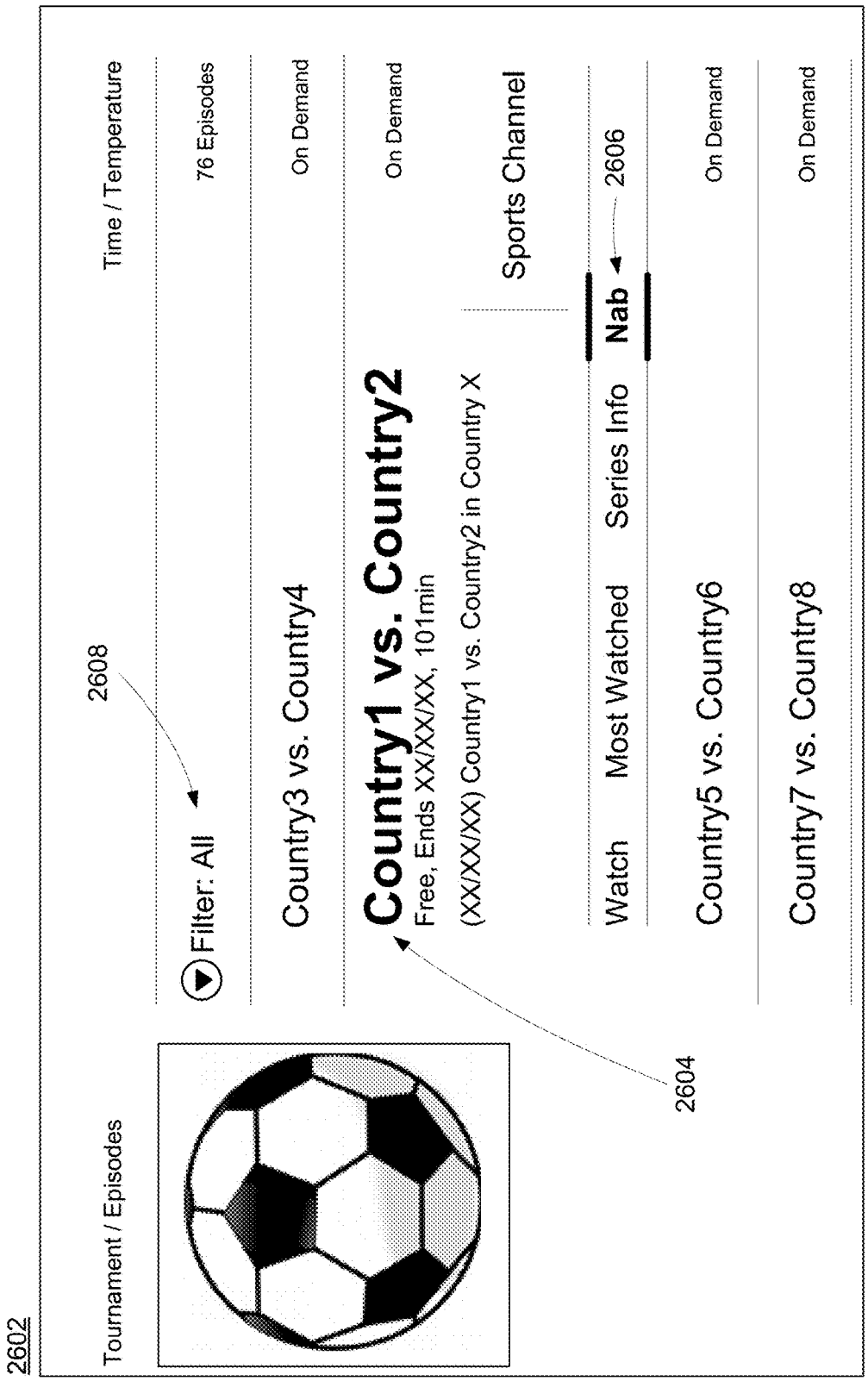
FIG. 26 illustrates an example display screen for selecting content according to one or more illustrative aspects of the disclosure.

FIG. 26 illustrates an example display screen 2602 for selecting content according to one or more illustrative aspects of the disclosure. The screen 2602 may be displayed on, for example, a television screen and present a listing 2608 that allows the user to search for or browse content available from a CDN 202, such as episodes or games from a soccer tournament. For example, 76 games may be available on demand. The screen 2602 displays four games, Country3 vs. Country4, Country1 vs. Country2, Country5 vs. Country6, and Country7 vs. Country8. The user may select the on demand episode Country1 vs. Country2 2604. The screen 2602 may display a nab option 2606 for the user to create a video clip from the episode 2604 and/or access other shared video clips from the episode 2604.

The various features described above are merely non-limiting examples, and can be rearranged, combined, subdivided, omitted, and/or altered in any desired manner. For example, features of the computing device (including the nab server, the first device, the second device and other servers) described herein can be subdivided among multiple processors and computing devices. The true scope of this patent should only be defined by the claims that follow.

We claim:

1. A method comprising:
    receiving, by a computing device and from a first device, information indicating a clip, of a first version among a plurality of versions of a content item, displayed on the first device, wherein each of the versions of the content item comprises a plurality of segments;
    receiving, by the computing device, a plurality of playlists, each associated with a different version of the plurality of versions of the content item;
    determining, based on a clip playlist of the plurality of playlists, timing information of a first plurality of segments associated with the clip;
    generating, based on the timing information, a plurality of modified playlists wherein each of the plurality of modified playlists is associated with a portion of a different version of the plurality of versions of the content item.

2. The method of claim 1, further comprising:
    sending the plurality of modified playlists to a second device, wherein the plurality of modified playlists is usable by the second device to access the portions of the different versions associated with the clip.

3. The method of claim 1, wherein the received plurality of playlists comprises a received first plurality of playlists, the method further comprising:
    receiving, by the computing device, a second plurality of playlists each comprising a reference to the received first plurality of playlists; and
    sending the plurality of modified playlists and the received second plurality of playlists to a second device.

4. The method of claim 1, method further comprising:
    receiving, by the computing device, a master playlist comprising references to the received plurality of playlists; and
    sending the plurality of modified playlists and the master playlist to a second device.

5. The method of claim 1, further comprising:
    receiving, by the computing device and from the first device, an indication that a user of a second device is permitted to access the plurality of modified playlists;
    generating a link for the plurality of modified playlists; and
    sending the link to the second device, wherein the link allows the second device to access the clip.

6. The method of claim 1, wherein the information indicating the clip comprises:
    a start time of the clip; and
    a duration of the clip or an end time of the clip, and
    wherein each of the plurality of playlists each comprises an index to at least a portion of the plurality of segments of each of the versions of the content item.

7. The method of claim 1, wherein the received plurality of playlists comprises entitlement information for the content item, and wherein generating the plurality of modified playlists comprises maintaining the entitlement information for the content item in the plurality of modified playlists.

8. An apparatus comprising:
    one or more processors; and
    memory storing instructions that, when executed by the one or more processors, cause the apparatus to:
        receive, from a first device, information indicating a clip, of a first version among a plurality of versions of a content item, displayed on the first device, wherein each of the versions of the content item comprises a plurality of segments;
        receive a plurality of playlists, each associated with a different version of the plurality of versions of the content item;
        determine, based on a clip playlist of the plurality of playlists, timing information of a first plurality of segments associated with the clip; and
        generate, based on the timing information, a plurality of modified playlists wherein each of the plurality of modified playlists is associated with a portion of a different version of the plurality of versions of the content item.

9. The apparatus of claim 8, wherein the instructions, when executed by the one or more processors, cause the apparatus to:
    send the plurality of modified playlists to a second device, wherein the plurality of modified playlists is usable by the second device to access the portions of the different versions associated with the clip.

10. The apparatus of claim 8, wherein the received plurality of playlists comprises a received first plurality of playlists, and wherein the instructions, when executed by the one or more processors, cause the apparatus to:
    receive a second plurality of playlists each comprising a reference to the received first plurality of playlists; and
    send the plurality of modified playlists and the received second plurality of playlists to a second device.

11. The apparatus of claim 8, wherein the instructions, when executed by the one or more processors, cause the apparatus to:
    receive a master playlist comprising references to the received plurality of playlists; and
    send the plurality of modified playlists and the master playlist to a second device.

12. The apparatus of claim 8, wherein the instructions, when executed by the one or more processors, cause the apparatus to:
    receive, from the first device, an indication that a user of a second device is permitted to access the plurality of modified playlists;
    generate a link for the plurality of modified playlists; and
    send the link to the second device, wherein the link allows the second device to access the clip.

13. The apparatus of claim 8, wherein the information indicating the clip comprises:
    a start time of the clip; and
    a duration of the clip or an end time of the clip, and wherein each of the plurality of playlists each comprises an index to at least a portion of the plurality of segments of each of the versions of the content item.

14. apparatus of claim 8, wherein the received plurality of playlists comprises entitlement information for the content item, and wherein the instructions, when executed by the one or more processors, cause the apparatus to generate the plurality of modified playlists by maintaining the entitlement information for the content item in the plurality of modified playlists.

15. A non-transitory computer-readable medium storing instructions that, when executed, cause:
receiving, from a first device, information indicating a clip, of a first version among a plurality of versions of a content item, displayed on the first device, wherein each of the versions of the content item comprises a plurality of segments;
receiving a plurality of playlists, each associated with a different version of the plurality of versions of the content item;
determining, based on a clip playlist of the plurality of playlists, timing information of a first plurality of segments associated with the clip;
generating, based on the timing information, a plurality of modified playlists wherein each of the plurality of modified playlists is associated with a portion of a different version of the plurality of versions of the content item.

16. The non-transitory computer-readable medium of claim 15, wherein the instructions, when executed, cause:
sending the plurality of modified playlists to a second device, wherein the plurality of modified playlists is usable by the second device to access the portions of the different versions associated with the clip.

17. The non-transitory computer-readable medium of claim 15, wherein the received plurality of playlists comprises a received first plurality of playlists, and wherein the instructions, when executed, cause:
receiving a second plurality of playlists each comprising a reference to the received first plurality of playlists; and
sending the plurality of modified playlists and the received second plurality of playlists to a second device.

18. The non-transitory computer-readable medium of claim 15, wherein the instructions, when executed, cause:
receiving a master playlist comprising references to the received plurality of playlists; and
sending the plurality of modified playlists and the master playlist to a second device.

19. The non-transitory computer-readable medium of claim 15, wherein the instructions, when executed, cause:
receiving, from the first device, an indication that a user of a second device is permitted to access the plurality of modified playlists;
generating a link for the plurality of modified playlists; and
sending the link to the second device, wherein the link allows the second device to access the clip.

20. The non-transitory computer-readable medium of claim 15, wherein the information indicating the clip comprises:
a start time of the clip; and
a duration of the clip or an end time of the clip, and
wherein each of the plurality of playlists each comprises an index to at least a portion of the plurality of segments of each of the versions of the content item.

* * * * *

UNITED STATES PATENT AND TRADEMARK OFFICE
CERTIFICATE OF CORRECTION

PATENT NO. : 10,565,258 B2
APPLICATION NO. : 14/965197
DATED : February 18, 2020
INVENTOR(S) : Brown et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this
Twenty-fourth Day of November, 2020

Andrei Iancu
*Director of the United States Patent and Trademark Office*